United States Patent
Nishimura et al.

(10) Patent No.: US 8,959,559 B2
(45) Date of Patent: Feb. 17, 2015

(54) CONTENT DISTRIBUTION SYSTEM, CONTENT DISTRIBUTION APPARATUS, CONTENT DISTRIBUTION METHOD, CONTENT DISTRIBUTION PROGRAM, AND CONTENT PLAYBACK APPARATUS

(75) Inventors: Hideki Nishimura, Osaka (JP); Jiro Kiyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 82 days.

(21) Appl. No.: 13/575,527

(22) PCT Filed: Mar. 4, 2011

(86) PCT No.: PCT/JP2011/055084
§ 371 (c)(1),
(2), (4) Date: Jul. 26, 2012

(87) PCT Pub. No.: WO2011/114913
PCT Pub. Date: Sep. 22, 2011

(65) Prior Publication Data
US 2012/0304204 A1    Nov. 29, 2012

(30) Foreign Application Priority Data
Mar. 17, 2010    (JP) ............... P2010-061033

(51) Int. Cl.
H04N 7/173    (2011.01)
H04N 21/237    (2011.01)
H04N 21/482    (2011.01)
H04N 21/81    (2011.01)
H02J 3/00    (2006.01)

(52) U.S. Cl.
CPC .......... *H04N 21/237* (2013.01); *H04N 21/482* (2013.01); *H04N 21/8126* (2013.01); *H02J 3/005* (2013.01)
USPC ............... 725/91; 725/93; 725/144; 725/146; 370/252; 713/300; 713/320; 713/340

(58) Field of Classification Search
USPC ................. 725/91, 93; 713/320; 370/252
See application file for complete search history.

(56) References Cited

U.S. PATENT DOCUMENTS

| | | | |
|---|---|---|---|
| 7,103,004 B2 * | 9/2006 | Wang | 370/252 |
| 2004/0158878 A1 * | 8/2004 | Ratnakar et al. | 725/150 |
| 2005/0053094 A1 * | 3/2005 | Cain et al. | 370/469 |
| 2005/0063314 A1 * | 3/2005 | Sahinoglu et al. | 370/252 |
| 2005/0282572 A1 * | 12/2005 | Wigard et al. | 455/522 |
| 2007/0136522 A1 | 6/2007 | Umemura et al. | |

(Continued)

FOREIGN PATENT DOCUMENTS

| | | |
|---|---|---|
| JP | 11-46460 A | 2/1999 |
| JP | 2007-328417 A | 12/2007 |

(Continued)

Primary Examiner — Robert Hance
(74) Attorney, Agent, or Firm — Birch, Stewart, Kolasch & Birch, LLP

(57) ABSTRACT

A content distribution system that is supplied with power from a plurality of power sources having different environmental loads and that distributes content to a content playback apparatus connected via a communication circuit, the content distribution system distributing content with respect to a content distribution request from the content playback apparatus with a service quality that is determined so as to suppress the environmental load by the power supplied from the plurality of power sources to a predetermined environmental load.

16 Claims, 21 Drawing Sheets

(56) References Cited

U.S. PATENT DOCUMENTS

| | | | |
|---|---|---|---|
| 2007/0192641 A1* | 8/2007 | Nagendra et al. | 713/320 |
| 2008/0141048 A1* | 6/2008 | Palmer et al. | 713/300 |
| 2010/0107171 A1* | 4/2010 | Amsterdam et al. | 718/104 |
| 2011/0106327 A1* | 5/2011 | Zhou et al. | 700/291 |
| 2011/0299549 A1* | 12/2011 | Diab et al. | 370/401 |
| 2011/0305462 A1* | 12/2011 | Buelow | 398/158 |
| 2012/0057450 A1* | 3/2012 | Abbas et al. | 370/216 |

FOREIGN PATENT DOCUMENTS

| | | |
|---|---|---|
| KR | 10-2001-0018693 A | 3/2001 |
| KR | 10-2006-0090566 A | 8/2006 |
| KR | 10-2007-0061416 A | 6/2007 |

* cited by examiner

FIG. 7

```
INVITE sip:vod_service@iptv.net SIP/2.0
From: sip:alice@iptv.net
To: sip:vod1@iptv.net v=0
o=alice 2890844526 2890842807 IN IP4 123.45.67.89
s=SDP Offer
t=0
m=video 51372 RTP/AVP 33
c=IN IP4 123.45.67.89
b=AS:15000
a=fmtp:33 eco; bitrate=2000-; brightness=50-
...
```

FIG. 8

| | |
|---|---|
| CONTENT DISTRIBUTION APPARATUS CURRENT POWER USE | 50 kW |
| NUMBER OF CURRENT SESSIONS | 500 SESSIONS |
| CURRENT OVERALL BIT RATE | 5000 Mbps |
| STATISTICAL AVERAGE NUMBER OF SESSIONS IN THE CURRENT TIME SLOT | 450 SESSIONS |
| STATISTICAL STANDARD DEVIATION OF NUMBER OF SESSIONS IN THE CURRENT TIME SLOT | 175 SESSIONS |

FIG. 9

| | |
|---|---|
| CLEAN ENERGY POWER USED | 50 kW |
| UNCLEAN ENERGY POWER USED | 0 kW |
| CLEAN ENERGY STORED POWER | 50 kWh |
| STORAGE RATE | +5 kW |

FIG. 10

| CONTENT ID | BIT RATE (kbps) | BRIGHTNESS |
|---|---|---|
| vod1-1 | 2000 | 100 |
| vod1-1-60 | 2000 | 60 |
| vod1-2 | 4000 | 100 |
| vod1-2-60 | 4000 | 60 |
| vod1-3 | 10000 | 100 |
| vod1-4 | 20000 | 100 |
| vod2-1 | 2000 | 100 |
| vod2-1-80 | 2000 | 60 |
| vod2-2 | 10000 | 100 |
| ... | | |

FIG. 11

| BIT RATE (kbps) | POWER USED | USABILITY IN ECO MODE |
|---|---|---|
| 2000 | 10W | ○ |
| 4000 | 20W | ○ |
| 10000 | 50W | ○ |
| 20000 | 100W | × |

FIG. 12

```
SIP/2.0 200 OK
From: sip:alice@iptv.net
To: sip:vod1@iptv.net v=0
o=iptv_service 2890844526 2890842807 IN IP4 100.1.1.100
s=SDP Answer
t=0
m=video 21372 RTP/AVP 33
c=IN IP4 100.1.1.100
a=fmtp:33 uri=rtsp://100.1.1.100/vod1; session=1111111
a=fmtp:33 eco=2; bitrate=4000; brightness=60
...
```

FIG. 13

| USER ID | VIEWING DATE | CONTENT ID | VIEWING TIME (MINUTES) | ENVIRONMENTAL INDEX |
|---|---|---|---|---|
| alice | 11/3 | vod12-3 | 120 | 3 |
| alice | 11/4 | vod5-2 | 60 | 2 |
| alice | 11/10 | vod9-4 | 60 | 0 |
| alice | 11/11 | vod10-1 | 60 | 1 |
| alice | 11/15 | vod1-2-60 | 120 | 2 |
| bob | ... | ... | ... | ... |
| caro | ... | ... | ... | ... |

FIG. 14

| POWER USED/AVERAGE SURPLUS POWER | ENVIRONMENTAL INDEX | UNIT PRICE (YEN/HOUR) |
|---|---|---|
| 0.1 OR LOWER | 3 | 40 |
| 0.5 OR LOWER | 2 | 60 |
| 1 OR LOWER | 1 | 80 |
| GREATER THAN 1 OR AVERAGE SURPLUS POWER IS 0 | 0 | 100 |

FIG. 15

| USER ID | BILLING MONTH | NON-eco VIEWING TIME | NON-eco BILLING | eco=1 VIEWING TIME | eco=1 BILLED AMOUNT | eco=2 VIEWING TIME | eco=2 BILLED AMOUNT | eco=3 VIEWING TIME | eco=3 BILLED AMOUNT | TOTAL BILLED AMOUNT |
|---|---|---|---|---|---|---|---|---|---|---|
| alice | 2009/11 | 60 | 100 | 60 | 80 | 180 | 180 | 120 | 80 | 440 |
| bob | ... | ... | ... | ... | ... | ... | ... | ... | ... | ... |
| carol | ... | ... | ... | ... | ... | ... | ... | ... | ... | ... |

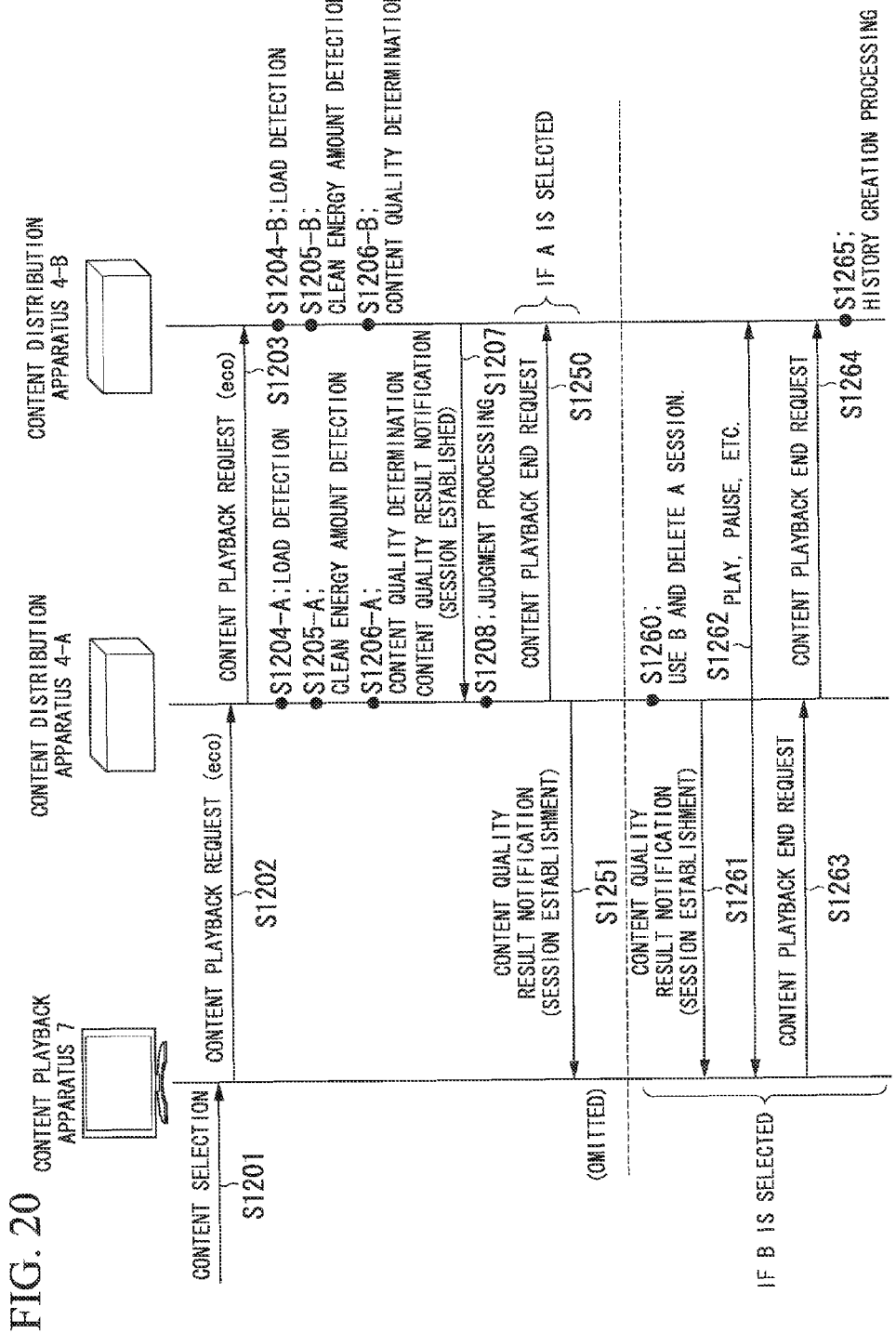

FIG. 21

|  | CONTENT DISTRIBUTION APPARATUS 4-A | CONTENT DISTRIBUTION APPARATUS 4-B |
|---|---|---|
| CLEAN ENERGY POWER USED | 40 kW | 50 kW |
| UNCLEAN ENERGY POWER USED | 5k W | 0 kW |
| CLEAN ENERGY STORED POWER | 10 kWh | 100 kWh |
| STORAGE RATE | −5 kW | +10 kW |

FIG. 22

```
SIP/2.0 200 OK
From: sip:alice@iptv.net
To: sip:vod1@iptv.net v=0
o=iptv_service 2890844526 2890842807 IN IP4 100.2.1.100
s=SDP Answer
t=0
m=video 31372 RTP/AVP 33
c=IN IP4 100.2.1.100
a=fmtp:33 uri=rtsp://100.2.1.100/vod1; session=1111111
a=fmtp:33 eco=1; bitrate=2000-; brightness=50-
...
```

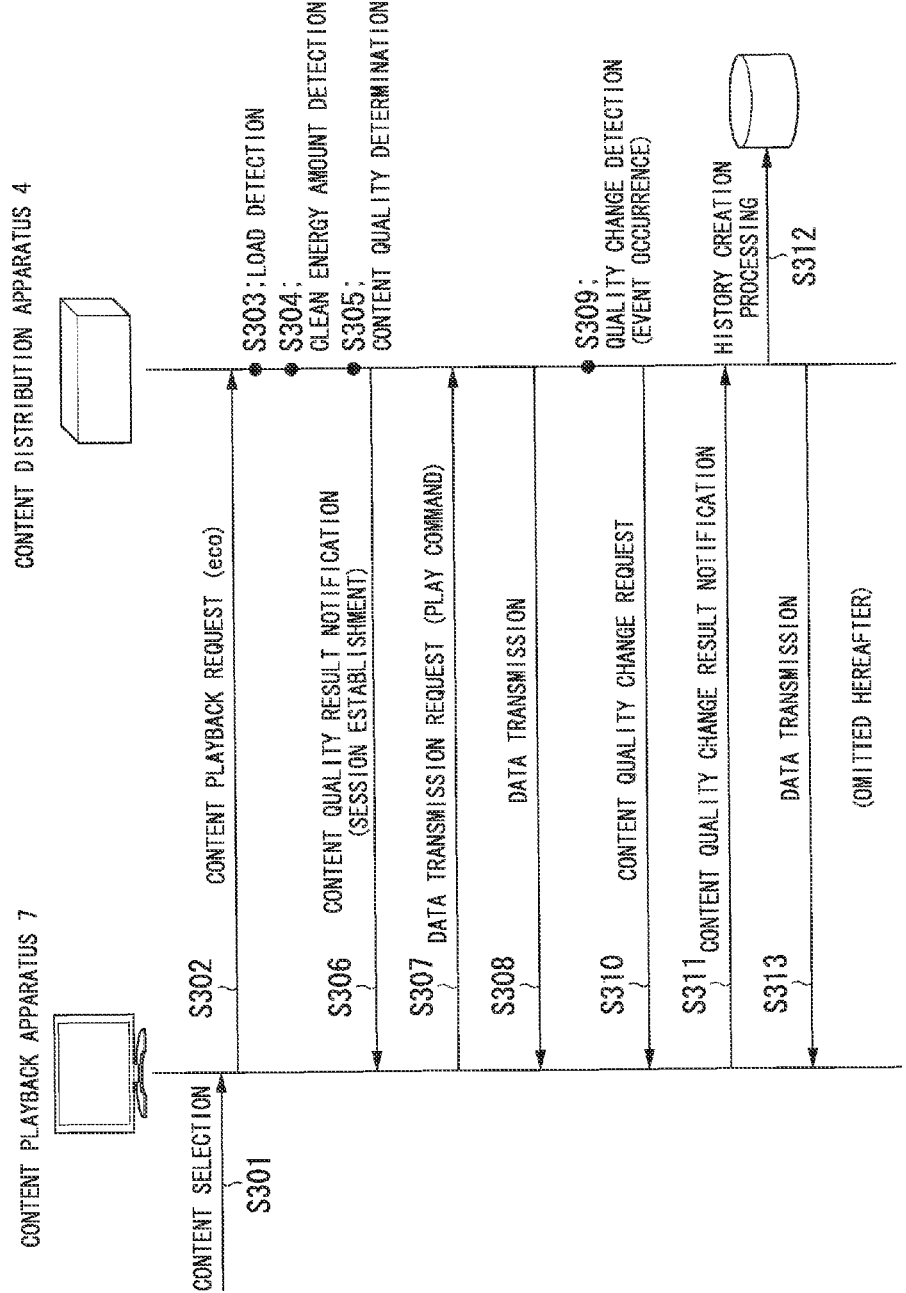

FIG. 24

```
INVITE sip:vod_service@iptv.net SIP/2.0
From: sip:alice@iptv.net
To: sip:vod1@iptv.net v=0
o=alice 2890844526 2890842807 IN IP4 123.45.67.89
s=SDP Offer
t=0
m=video 51372 RTP/AVP 31
c=IN IP4 123.45.67.89
b=AS:15000
a=fmtp:33 eco; flexible; bitrate=2000-; brightness=50-
...
```

FIG. 25

```
SIP/2.0 200 OK
From: sip:alice@iptv.net
To: sip:vod1@iptv.net v=0
o=iptv_service 2890844526 2890842807 IN IP4 100.1.1.100
s=SDP Answer
t=0
m=video 21372 RTP/AVP 31
c=IN IP4 100.1.1.100
a=fmtp:33 uri=rtsp://100.1.1.100/vod1; session=1111111
a=fmtp:33 eco=2; flexible; bitrate=4000; brightness=60
...
```

```
INVITE sip:vod1@iptv.net SIP/2.0
From: sip:vod1@iptv.net
To: sip:alice@iptv.net v=0
o=iptv_service 2890844526 2890842808 IN IP4 100.1.1.100
s=SDP Offer
t=0
m=video 21372 RTP/AVP 31
c=IN IP4 100.1.1.100
a=fmtp:33 uri=rtsp://100.1.1.100/vod1; session=1111111
a=fmtp:33 eco=2; flexible; bitrate=2000; brightness=60
...
```

CONTENT DISTRIBUTION SYSTEM, CONTENT DISTRIBUTION APPARATUS, CONTENT DISTRIBUTION METHOD, CONTENT DISTRIBUTION PROGRAM, AND CONTENT PLAYBACK APPARATUS

TECHNICAL FIELD

The present invention relates to a content distribution system, a content distribution apparatus, a content distribution method, a content distribution program, and a content playback apparatus.

The subject application claims priority based on the patent application No. 2010-061033 filed in Japan on Mar. 17, 2010 and incorporates by reference herein the content thereof.

BACKGROUND ART

In recent years, content playback apparatuses (IPTVs: IP television sets) have appeared that can connect to an IP (Internet Protocol) network and playback content distributed from a content distribution apparatus (server). In the past, as a system that determines the content and the (bit rate) quality between such clients and servers, there have been the SIP (Session Initiation Protocol; refer to Non-Patent Document 1) and the SDP (Session Description Protocol; refer to Non-Patent Document 2 and Non-Patent Document 3). This is an arbitration scheme in which either one of a client and a server proposes an option for content quality, and the other selects any one and gives a response, using a determined format.

Patent Document 1 provides a method for applying a limit to the response with respect to a request from a client, in response to the load at the server side. This calculates the load of requests from each client for each individual load type (for example, CPU load X, number of simultaneous connections Y) with respect to the server load, and limits the handling of requests so that the server load is not exceeded for each type of load, with service not being provided for requests that exceed the limit.

PRIOR ART DOCUMENT

Patent Documents

Patent Document 1: Japanese Unexamined Patent Application, First Publication No. 2007-328417

Non-Patent Documents

Non-Patent Document 1: RFC 3261
Non-Patent Document 2: RFC 4566
Non-Patent Document 3: RFC 3264

DISCLOSURE OF INVENTION

Problem to be Solved by the Invention

In recent years, concern regarding protecting the global environment has heightened. The term ecology has become the hallmark of this concern regarding protecting the global environment, and a culture of sparing no efforts in protecting the environment is emerging. In particular, there are growing demands to stop the increase of carbon dioxide ($CO_2$) which is said to be related to global warming. No doubt, the future will see reductions in the amount of carbon dioxide emission in various fields, in efforts to suppress the environmental load.

In this regard, although the technology of Patent Document 1 limits request handling and suppresses server load, it has the problem that it cannot suppress environmental loading.

The present invention was made in consideration of this situation and has as an object to provide a content distribution system, a content distribution apparatus, and a content distribution method, capable of distributing content while suppressing environmental loading, a program therefor, and a content playback apparatus.

Means to Solve the Problem (1) The present invention is made to solve the above-described problem, and a first aspect of the present invention is a content distribution system that is supplied with power from a plurality of power sources including different environmental loads and that distributes content to a content playback apparatus connected via a communication circuit, wherein the content distribution system distributes content with respect to a content distribution request from the content playback apparatus with a service quality that is determined so as to suppress the environmental load by the power supplied from the plurality of power sources to a predetermined environmental load.

(2) In the first aspect of the present invention, the content playback apparatus may include a content distribution apparatus that distributes content, and the content distribution apparatus may include: a power detecting unit configured to detect the amount of power used of each of the plurality of power sources; a load detecting unit configured to detect the amount of load of the content distribution apparatus; an arbitrating unit configured to determine, with respect to a content distribution request from the content playback apparatus, based on the detected amount of power used and load amount, in case that the load amount of the content distribution apparatus reaches a predetermined maximum load amount, the bit rate of the distributed content so that the environmental load by the power supplied from the plurality of power sources is suppressed to a predetermined environmental load; and a content distributing unit configured to distribute content data at the bit rate determined by the arbitrating unit.

(3) In the first aspect of the present invention, the power detecting unit may detect, of the plurality of power sources, at least the power that can be supplied by power sources other than the power source including the largest environmental load, and the arbitrating unit, in determining the bit rate for the content to be distributed, may use the power that can be supplied.

(4) In the first aspect of the present invention, the arbitrating unit may determine the bit rate of the content being distributed so as to suppress to the predetermined environmental load, in case that it judges, based on the amount of power used and the amount of power that can be supplied, which are detected by the power detecting unit, and the amount of load which is detected by the power detecting unit, that it becomes impossible midway in content distribution to suppress to the predetermined environment load; and the content distributing unit may change the bit rate of the content being distributed to the determined bit rate.

(5) In the first aspect of the present invention, the environmental load may be the emission of carbon dioxide, and the plurality of power sources are clean energy that does not emit carbon dioxide at the time of power generation and unclean energy that emits carbon dioxide.

(6) In the first aspect of the present invention, the content distribution system may include a billing processor that determines a billed amount based on an environmental index that is the degree to which the power consumed with the distribution of content suppresses the use of the second power.

(7) In the first aspect of the present invention, the content playback apparatus may include a plurality of content distribution apparatuses that distribute content, of which content distribution apparatuses at least one is supplied power by a power source that is different than that of the others, and with respect to a content distribution request from the content playback apparatus, a content distribution apparatus that distributes content may be selected so that the environmental load by the power supplied from the plurality of power sources is suppressed to a predetermined environmental load.

(8) In the first aspect of the present invention, the distribution of content with respect to a content distribution request from the content playback apparatus with a service quality that is determined so as to suppress to the predetermined environmental load may be done in case that an instruction is given from the content playback apparatus for distribution with a suppressed environmental load.

(9) A second aspect of the present invention is a content distribution apparatus that is supplied with power from a plurality of power sources including different environmental loads and that distributes content to a content playback apparatus connected via a communication circuit, the content distribution apparatus distributes content with respect to a content distribution request from the content playback apparatus with a service quality that is determined so as to suppress the environmental load by the power supplied from the plurality of power sources to a predetermined environmental load.

(10) A third aspect of the present invention is a content distribution method that is supplied with power from a plurality of power sources including different environmental loads and that distributes content to a content playback apparatus that is connected via a communication circuit, the content distribution method including: distributing content with respect to a content distribution request from the content playback apparatus with a service quality that is determined so as to suppress the environmental load by the power supplied from the plurality of power sources to a predetermined environmental load.

(11) A fourth aspect of the present invention is a program for causing a computer of a content distribution apparatus that is supplied with power from a plurality of power sources including different environmental loads and that distributes content to a content playback apparatus that is connected via a communication circuit to function as means for distributing content with respect to a content distribution request from the content playback apparatus with a service quality that is determined so as to suppress the environmental load by the power supplied from the plurality of power sources to a predetermined environmental load.

(12) A fifth aspect of the present invention is a content playback apparatus that receives and plays back content distributed by a content distribution apparatus that distributes content with a service quality determined so that the environmental load by the power supplied from a plurality of power sources is suppressed to a predetermined environmental load; the content playback apparatus instructs a content distribution apparatus to distribute with a suppressed environmental load.

Effect of the Invention

According to the present invention, it is possible to distribute content with a suppressed environmental load.

BRIEF DESCRIPTION OF THE DRAWINGS

FIG. 7 shows an example of a content distribution request in the same embodiment.

FIG. 8 is a table showing an example of information regarding which notification is made by the load detecting unit 403 at sequence S203 in the same embodiment.

FIG. 9 is a table showing an example of supply amount information in the same embodiment.

FIG. 10 is a table showing an example of information regarding content data stored in content database 504 in the same embodiment.

FIG. 11 is a table showing an example of the relationship between the bit rate and the power used that is stored in an arbitrating unit 404 in the same embodiment.

FIG. 12 shows an example of an SIP message that notifies of the result of the determination of the content quality transmitted by the arbitrating unit 404 in the same embodiment.

FIG. 13 is a table showing an example of the historical information stored in the history database 502 in the same embodiment.

FIG. 14 is a table showing the relationship between the ratio of power used to average surplus power, the environmental index, and the billed amount (unit amount) in the same embodiment.

FIG. 15 is as table showing the amount billed to each user stored in the billing database 501 in the same embodiment.

FIG. 20 is a sequence diagram showing the flow of processing when playing back content in the same embodiment.

FIG. 21 is a table showing examples of the amount of clean energy used and the like detected at points A and B in the same embodiment.

FIG. 22 shows an example of a content quality result notification in the same embodiment.

FIG. 23 is a sequence diagram describing the dynamic change in content quality during a session in a variation example of the first embodiment of the present invention.

FIG. 24 is a drawing showing an example of a content playback request in the same variation example.

FIG. 25 is a drawing showing an example of a content quality result notification in the same variation example.

BEST MODE FOR CARRYING OUT THE INVENTION

[First Embodiment]

Figure 1:
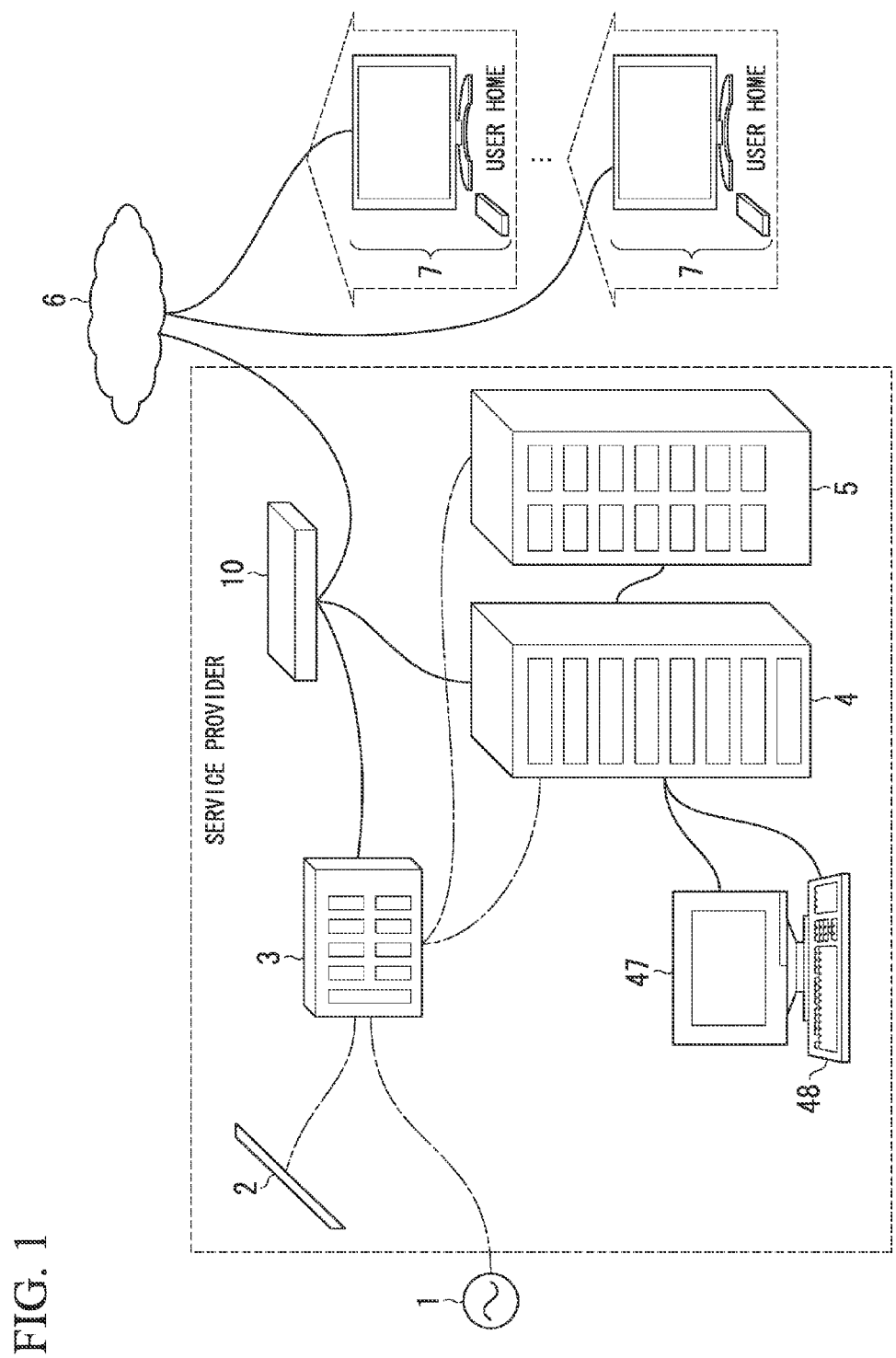
FIG. 1 is a conceptual drawing showing the constitution of a content distribution system according to a first embodiment of the present invention.

The first embodiment of the present invention will be described below, with references made to the drawing. FIG. 1 is a conceptual drawing showing the constitution of a content distribution system according to the present embodiment. The content distribution system according to the present embodiment has grid power 1 from an electrical power company, a solar photovoltaic panel 2, the power control unit 3, the content distribution apparatus 4, a display 47, a keyboard 48, the database apparatus 5, a network 6, a plurality of content playback apparatuses 7, and an Ethernet (registered trademark) switching apparatus 10. The solar photovoltaic panel 2, the power control unit 3, the content distribution apparatus 4, the display 47, the keyboard 48, and the database apparatus 5 are installed by a service provider, and the content playback apparatus 7 is installed by the user in the home of the user.

In FIG. 1, the solid lines indicate connections by data lines such as Ethernet (registered trademark) cables, optical fibers, and USB (Universal Serial Bus) cables, and the dash-dot lines indicate connections of electrical power lines. That is, the power control unit 3, the content distribution apparatus 4, and the network 6 are connected to the Ethernet (registered trademark) switching apparatus 10 via an Ethernet (registered trademark) cable such as an UTP (unshielded twisted pair) cable. The display 47 is connected to the content distribution apparatus 4 via a DVI (Digital Visual Interface) cable or the like, the keyboard 48 is connected thereto via a USB cable or the like, and the database apparatus 5 is connected thereto via an optical fiber for a fiber channel, a coaxial cable, or an Ethernet (registered trademark) cable or the like. The power from the grid power 1 and the solar photovoltaic panel 2 is input to the power control unit 3, and power that is further distributed by the power control unit 3 is input to the content distribution apparatus 4 and the database apparatus 5. Although the database apparatus 5 is directly connected to the content distribution apparatus 4, it may be connected via the Ethernet (registered trademark) switching apparatus 10.

Figure 2:
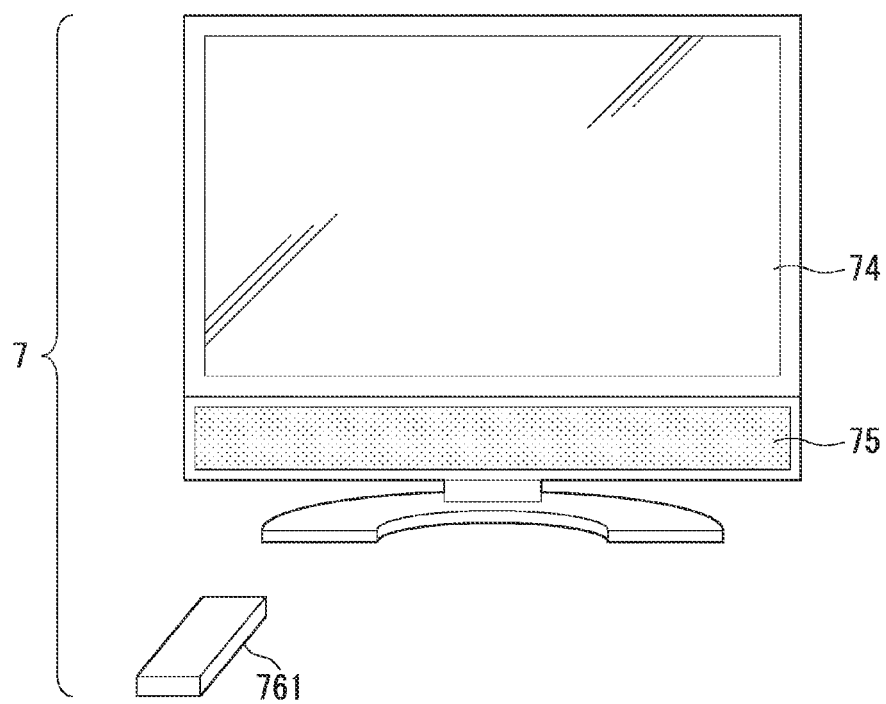
FIG. 2 is an outer view of a content playback apparatus 7 in the same embodiment.

FIG. 2 is an outer view of the content playback apparatus 7. The content playback apparatus 7 has a display unit 74 that displays video, a speaker 75 that outputs audio, and a remote controller 761 that enables operation input such as selection of content.

Figure 3:
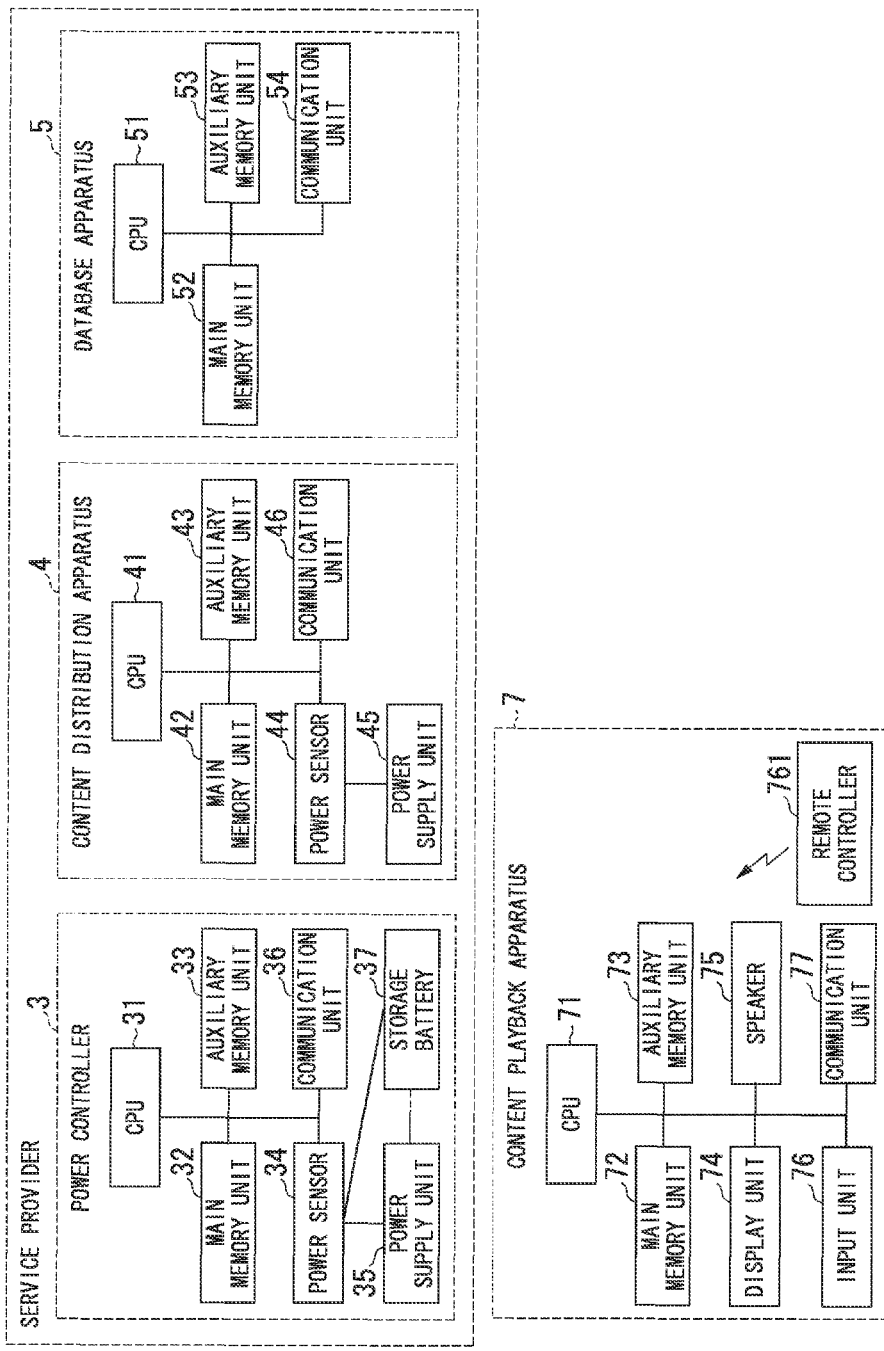
FIG. 3 is hardware block diagram showing a power controller 3, a content distribution apparatus 4, a database apparatus 5, and the content playback apparatus 7 in the same embodiment.

FIG. 3 is a hardware block diagram that shows the hardware constitution of the power control unit 3, the content distribution apparatus 4, the database apparatus 5, and the content playback apparatus 7. The power control unit 3 has a CPU 31, a main memory unit 32, an auxiliary memory unit 33, a power sensor 34, a power supply unit 35, a communication unit 36, and a storage battery 37. The CPU 31, the main memory unit 32, the auxiliary memory unit 33, the power sensor 34, and the communication unit 35 are connected via an internal bus. The power supply unit 35 receives and distributes the inputs of power from the solar photovoltaic panel 2, the grid power 1, and the storage battery 37, supplying power to the content distribution apparatus 4 and the database apparatus 5.

The power supply unit 35 preferentially distributes power from the solar photovoltaic panel 2 and, when the power supplied from the solar photovoltaic panel 2 is insufficient, distributes power from the storage battery 37, and if that is still insufficient, distributes power from the grid power 1. When there is a surplus of power supplied from the solar photovoltaic panel 2, the power supply unit 35 charges the storage battery 37 with the surplus power. The power sensor 34 detects the power (wattage) supplied from each of the solar photovoltaic panel 2, the grid power 1, and the storage battery 37.

The CPU 31 reads a control program stored in the auxiliary memory unit 33, and by using the main memory unit 32 as working memory to execute the program, performs various types of control and, if necessary, uses the communication unit 36 to communicate with the content distribution apparatus 4 and the like. Although the communication unit 36 is, for example, an Ethernet (registered trademark) terminal, it may also be an RS-232C (Recommended Standard 232-C) or other communication interface.

The content distribution apparatus 4 is a computer such as a personal computer, a workstation, or a server and has a CPU 41, a main memory unit 42, an auxiliary memory unit 43, a power sensor 44, a power supply unit 45, and a communication unit 46. The CPU 41, the main memory unit 42, the auxiliary memory unit 43, the power sensor 44, and the communication unit 46 are connected via an internal bus. Although in this case the content distribution apparatus 4 is described as being constituted by a single computer, it may be constituted by plurality of personal computers or workstations. The power supply unit 45 receives a supply of power from the power control unit 3 for operating that unit. The power sensor 44 detects the power supplied to the power supply unit 45.

The CPU 41 reads a control program stored in the auxiliary memory unit 43 for causing operation as the content distribution apparatus 4 and, by using the main memory unit 42 as working memory to execute the program, performs various types of control and, if necessary, uses the communication unit 46 to communicate with the power control unit 3, the database apparatus 5, the content playback apparatus 7, and the like. Although the communication unit 46 is, for example, an Ethernet (registered trademark) terminal, a DVI terminal, a USB terminal, or an optical fiber terminal, it may also be an RS-232C (Recommended Standard 232-C), another communication interface, or combination thereof. Input/output devices such as the display 47 and the keyboard 48 shown in FIG. 1 are connected to the communication unit 46. An administrator can perform administrative operations regarding the content distribution apparatus 4 using these input/output devices. The control program stored in the auxiliary memory unit 43 is constituted by an OS (operating system), an HTTP server program, and application server programs and the like. The various parts (functional blocks) constituting the content distribution apparatus 4, which are described later, share these functions.

The database apparatus 5 is a computer, for example, a personal computer, a workstation, or a server, and has a CPU 51, a main memory unit 52, an auxiliary memory unit 53, and a communication unit 54. The CPU 51, the main memory unit 52, the auxiliary memory unit 53, and the communication unit 54 are connected via an internal bus. Although in this case the database apparatus 5 is described as being constituted by a single computer, it may be constituted by plurality of personal computers or workstations. The CPU 51 reads the control program stored in the auxiliary memory unit 53 and, by using the main memory unit 52 as working memory to execute the program, performs various types of control and, if necessary, uses the communication unit 54 to communicate with the content distribution apparatus 4. The control program stored in the auxiliary memory unit 53 includes an OS (operating system) and database management software, and the CPU 51 executes the control program so to manage data within the auxiliary memory unit 53, based on a request form the content distribution apparatus 4. Although it is not illustrated, the database apparatus 5 may also have input/output devices such as a keyboard, a mouse, and a monitor so as to enable administration operations by an administrator, similar to the content distribution apparatus 4. The communication unit 54 is, for example an Ethernet (registered trademark) terminal, and optical fiber terminal, but may also be another communication interface.

The content playback apparatus 7 is, for example, a network-ready digital television image receiver, or a set-top box to which are connected a display and speaker, such as a digital television, or a DVD (Digital Versatile Disc) recorder, and has a CPU 71, a main memory unit 72, an auxiliary memory unit 73, a display unit 74, a speaker 75, an input unit 76, a communication unit 77, and a remote controller 761. The CPU 71, the main memory unit 72, the auxiliary memory unit 73, the display unit 74, the speaker 75, the input unit 76, and the communication unit 77 are connected via an internal bus.

The CPU 71 reads a control program stored in the auxiliary memory unit 73 and, by using the main memory unit 72 as working memory to execute the program, performs various types of control. Also, the CPU 71 receives a user operation at the input unit 76 and, if necessary, communicates with content distribution apparatus 4 and the like, using the communication unit 77. The CPU 71 decodes video data received by the communication unit 77 from the content distribution apparatus 4 and outputs the result to the display unit 74 and the speaker 75. The input unit 76 is actually a receiving unit for the remote controller 761, which utilizes an infrared or other wireless communication means. The auxiliary memory unit 73 is constituted by a flash memory, a magnetic disc, or the like.

Figure 4:
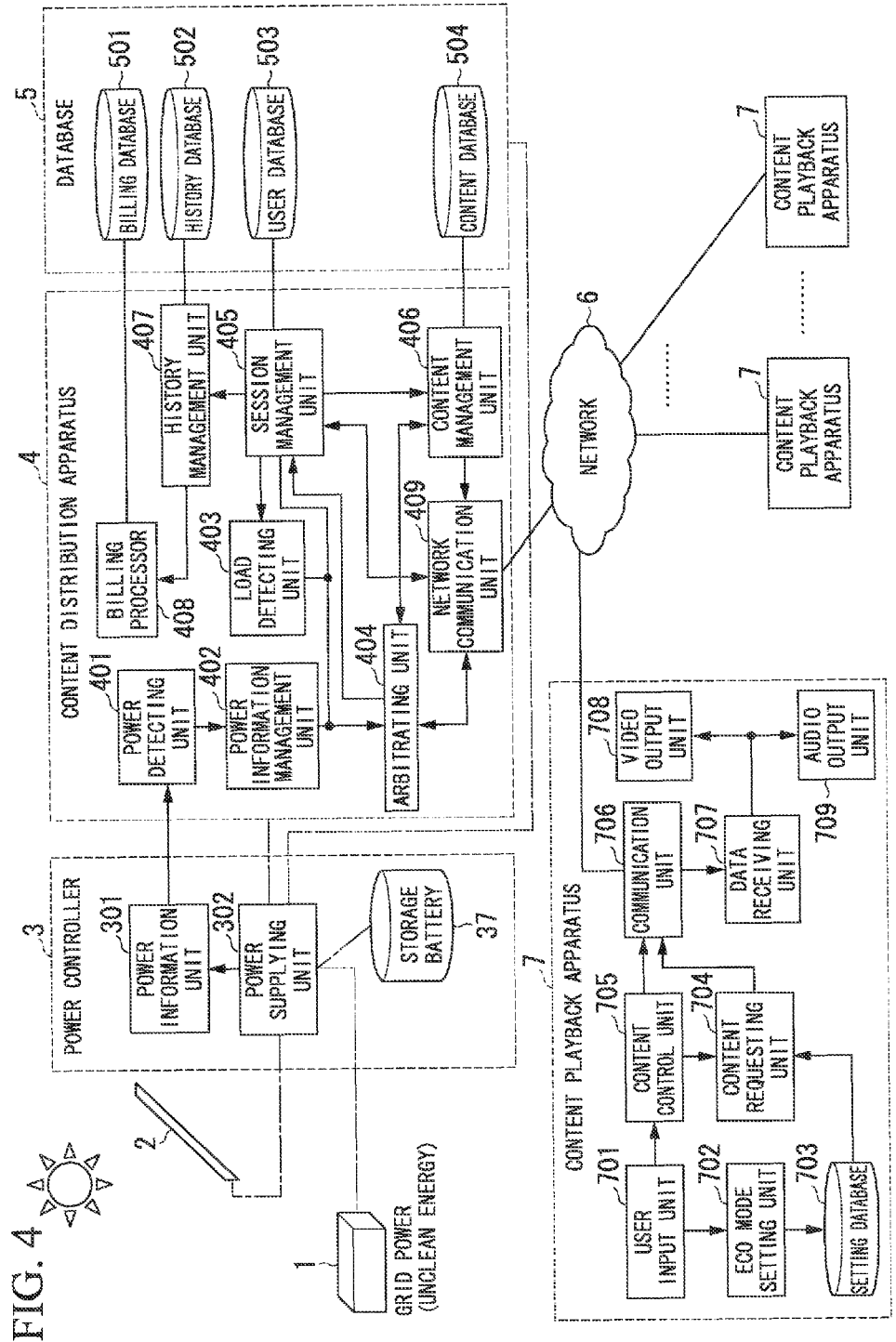
FIG. 4 is a functional block diagram showing the constitution of a content distribution system in the same embodiment.

FIG. 4 is a functional block diagram that shows the constitution of the content distribution system according to the present embodiment. The grid power 1 is power that is purchased from an electrical power company. At present, electrical power companies generate power from various energy sources, such as, mainly, thermal power, water power, and nuclear power. Of these, although there are some that are friendly to the global environment (that is, do not emit carbon dioxide and do not use resources), in many ratios the energy source is based on a depletable energy, such as typified by so-called fossil fuels, and this can be said to be electrical power that emits carbon dioxide and has a large environmental load. Herein, the grid power 1 will be referred to as unclean energy.

The solar photovoltaic panel 2 is an apparatus that converts sunlight directly into electricity, without uses the earth's resources, and the power obtained therefrom is energy that does not emit carbon dioxide and has a small environmental load. There are other forms of such energy, such as wind power generation, and they will be collectively referred to herein as clean energy. In the present embodiment, because the power stored in the storage battery 37 is supplied from the solar photovoltaic panel 2, the power supplied from the storage battery 37 is also clean energy.

The power control unit 3 receives a supply of power from the grid power 1 and the solar photovoltaic panel 2 and, in addition to supplying power to the content distribution apparatus 4 and the like, notifies the content distribution apparatus 4 of supply amount information indicating each of the supplied amounts (powers) in the form of a digital signal. The power control unit 3 has a power information unit 301, a power supplying unit 302, and the storage battery 37. The power information unit 301 uses the power sensor 34 of FIG. 3 to detect the power supply amount by each of the grid power 1, the solar photovoltaic panel 2, and the storage battery 37, and stores information as supply amount information, which is calculated based on these and indicates the amount of unclean energy, the amount of clean energy, the power amount of stored clean energy, and the rate of storage. The power information unit 301 also notifies the content distribution apparatus 4 of the supply amount information as a digital signal, via the communication unit 36 of FIG. 3.

The power supplying unit 302 receives a supply of power from the grid power 1, the solar photovoltaic panel 2, and the storage battery 37 and supplies it to the associated unit, the content distribution apparatus 4 and the database apparatus 5. The storage battery 37 stores surplus power that is generated by the solar photovoltaic panel 2 by not consumed by the content distribution apparatus 4 and the like. This power is discharged when, for example, the amount of power generated by the solar photovoltaic panel 2 is insufficient. When discharge occurs, the method of controlling the power may be, for example, supply of the maximum power (for example, 1 kW) at all times, or supply of the required power no greater than a preset power, for example, a somewhat suppressed power (for example, 100 W). Alternatively, the method might be supply of the required power no greater than the value obtained by dividing the amount of stored power by a preset discharge time (for example, a minimum of one hour), and may also be another control method.

The content distribution apparatus 4 has a power detecting unit 401, a power information management unit 402, a load detecting unit 403, an arbitrating unit 404, a session management unit 405, a content management unit 406, a history management unit 407, a billing processor 408, and a network communication unit 409. The power detecting unit 401 periodically receives supply amount information from the power information unit 301 of the power control unit 3 and, with respect to a request from the power information management unit 402, provides the supply amount information at that point in time. The power information management unit 402 holds the supply amount information provided by the power detecting unit 401 and, with respect to a request from the arbitrating unit 404, provides the supply amount information at that point in time.

The loading detecting unit 403, using the power sensor 44 shown in FIG. 3, detects the power consumed by the content distribution apparatus 4 itself. The load detecting unit 403 issues an inquiry to the session management unit 405 and obtains information indicating the load applied to the content distribution apparatus 4. The load detecting unit 403, by request of the arbitrating unit 404 provides power information and load information at that point in time. The information that indicates the load is, for example, the number of sessions or the overall bit rate, as described later. The arbitrating unit 404, with respect to a content playback request received from the content playback apparatus 7, via the network communication unit 409, determines the bit rate of content to be distributed so that the power used by the content distribution apparatus 4 is handled by only clean energy when the load amount of the content distribution apparatus 4 reaches a predetermined maximum load, and responds via the network communication unit 409. The arbitrating unit 04, when making that determination, references various information that is managed by the power information management unit 402, the load detecting unit 403, the session management unit 405, and the content management unit 406. The arbitrating unit 04 generates a response, including information that indicates the determined content quality, as a response message in accordance with a specific format, transmits the response via the network communication unit 409 to the content playback apparatus 7 that had originated the request.

The session management unit 405 manages the user database 503 of the database apparatus 5 and stores in the user database 503 and manages as sessions content viewing units that are requested and established by the content playback apparatus 7, in association with users IDs. The session management unit 405 provides to the load detecting unit 403 session management information, which includes the number of sessions and overall bit rate as information that indicates the load and, at the end of a session, requests the creation of a history to the history management unit 407. The content management unit 406 manages the content database 54 of the database apparatus 5. For example, the content management unit 406, following a request from the arbitrating unit 404, reads out content data and summary information stored in the content database 54, and transmits these to the content playback apparatus 7 via the network communication unit 409. In this case, content data is encoded video and audio data, and summary information is data such as the content title and summary, which introduce the content to the viewer.

The history management unit 407 manages the history database 502 of the database apparatus 5. For example, the history management unit 407, following a request from the session management unit 405, each time content is played back by the content playback apparatus 7, creates history information, which includes the identification of the played back content, the quality thereof, the viewing start time and end time, and the like, and stores this in the history database 502. The billing processor 408 manages the billing database 501 of the database apparatus 5. For example, the billing processor 408 calculates the final content viewing billed amount by totaling, referring via the history management unit 407 to the various history information registered in the history database apparatus 502, and stores the calculated content viewing billed amount for each user into the billing database 501. After that, upon receiving an operator operation, the billing processor 408 references the billing database 501 and issues a monthly invoice for each individual user. The service provider uses these invoices to perform collection of billed amounts. The network communication unit 409, using a network interface (communication unit 46) such as typified by the Ethernet (registered trademark), performs data communication with the content playback apparatus 7 that is connected by the network 6, such as the Internet.

The database apparatus 5 has the billing database 501, the history database 502, the user database 503, and the content database 504. The billing database 501 stores the monthly content viewing billed amounts for each user and, in response to a registration request, a search request, or the like from the billing processor 408, performs data storage and searching. The history database 502 stores history information for each viewing of each user and, in response to a registration request, a search request, or the like from the history management unit 407, performs data storage and searching. The user database 503 stores user identification information, user information such as user names and passwords and, in response to a registration request, a search request, or the like from the session management unit 405, performs storage of data related specific users and searching. The content database 504 stores content data and summary information for various VoD (video on demand) content and, in response to a search request or a distribution request from the content management unit 406, performs data searching.

The content playback apparatus 7 has a user input unit 701, an eco mode setting unit 702, a setting database 703, a content requesting unit 704, a content control unit 705, a communication unit 706, a data receiving unit 707, a video output unit 708, and an audio output unit 709. The user input unit 701 receives an input by a user operation and notifies various units of the type of the input. Input by a user operation, specifically, is received by buttons on a remote controller 761 or on the upper part of the main unit. The content playback apparatus 7 basically operates with input by a user operation with respect to the user input unit 701 as the trigger.

The eco mode setting unit 702 is the unit that sets whether or not to operate the content playback apparatus 7 in a mode that considers the environment. Specifically, the eco mode setting unit 702 receives a request, via the user input unit 701, by a user operation with respect to setting items on a menu screen, and records the requested mode in the setting database 703. The setting database 703 stores various settings within the content playback apparatus 7, which include eco mode setting information indicating whether or not the eco mode is set.

The content requesting unit 704, by an instruction of the content control unit 705, makes a content distribution request specified from the content control unit 705 to the content distribution apparatus 4, via the communication unit 706. The content requesting unit 704 receives a response message with respect to the request for distribution and makes notification to the content control unit 705. The content requesting unit 704, when making the content distribution request, references the eco mode setting information stored in the setting database 703, and makes the distribution request. The content control unit 705, by an instruction of the user input unit 701, makes a content distribution request to the content requesting unit 704, and receives from the content requesting unit 704 a response message to the content distribution request. The content control unit 705 processes the received response message, establishes the content distribution session, and issues requests to the content distribution apparatus 4 via the communication unit 706 to start, pause, and stop the content distribution.

The communication unit 706, via the network 6 and the network communication unit 409, communicates with various units of the content distribution apparatus 4. The data receiving unit 707 receives and decodes the content data distributed by the content distribution apparatus 4, and separates it into video data and audio data, each of which it forwards to the video output unit 708 and the audio output unit 709. The video output unit 708 causes display of the video of the forwarded video data on the display unit 74 of FIG. 3. The audio output unit 709 outputs the audio of the forwarded audio data to the speaker 75 of FIG. 3. The content distribution apparatus 4 can provide service to a plurality of content playback apparatuses 7 simultaneously, a plurality of content playback apparatuses 7 being shown in FIG. 4, the plurality of content playback apparatuses 7 having the same constitution.

Figure 5:
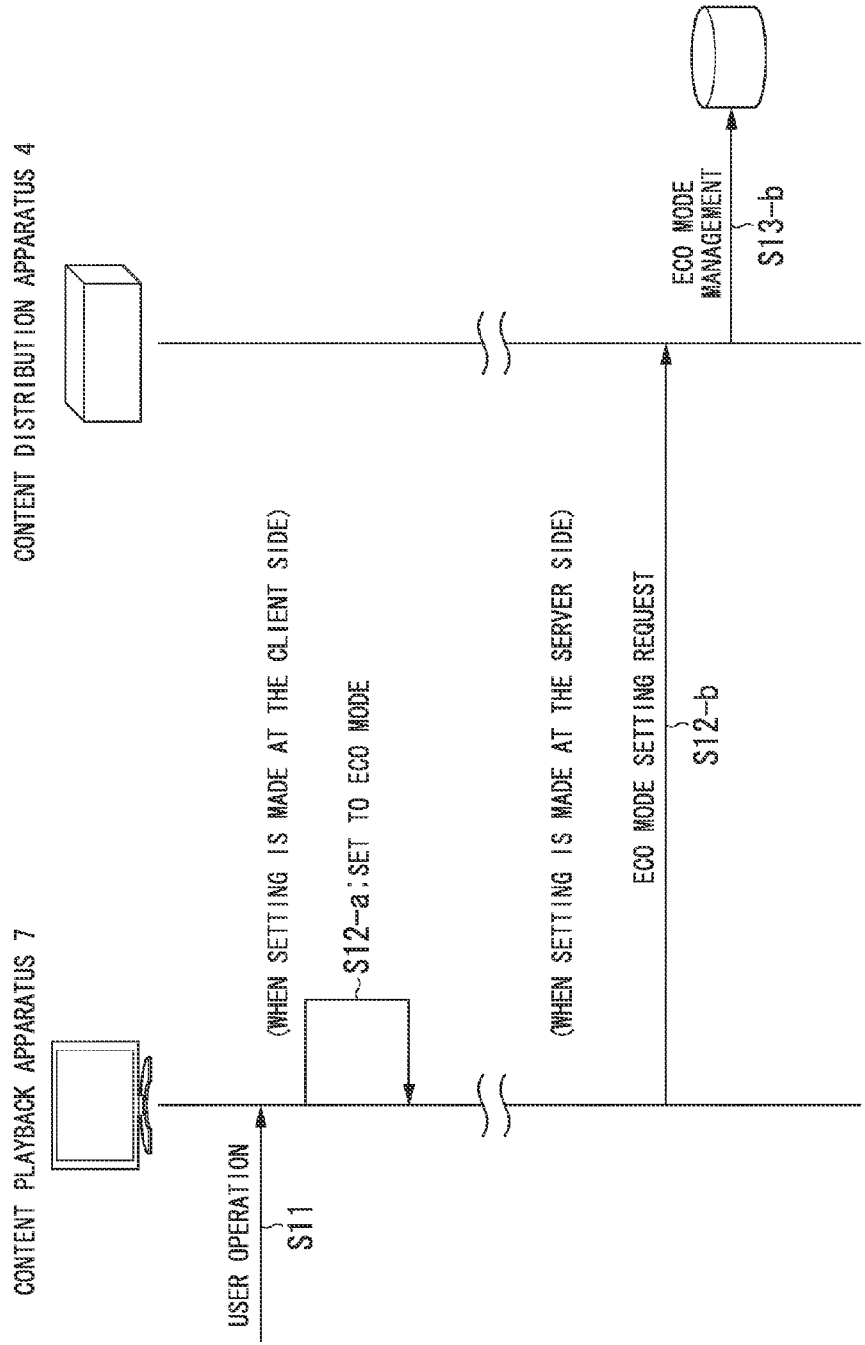
FIG. 5 is a sequence diagram showing processing regarding the "Eco Mode" setting in the same embodiment.

FIG. 5 is a sequence diagram showing the processing related to setting of the eco mode. In the present embodiment, the eco mode is a mode that instructs distribution with suppressed environmental load, that is, a mode, which, if it is possible to reduce the amount of carbon dioxide emissions in order to protect the global environment, automatically selects that distribution. During the time that the eco mode is set, the content requesting unit 704 of the content playback apparatus 7 performs arbitration of the content quality with the arbitration unit 404 of the content distribution apparatus 4 on the assumption of that mode, so that the power used in content distribution can be handled by clean energy. A non-eco mode is a mode in which, when arbitrating the content quality, such consideration is not made.

First, using the remote controller 761, the user performs an operation with respect the content playback apparatus 7 in order to set the eco mode (S11). The user input unit 701 then detects this operation, and notifies the eco mode setting unit 702. When this notification is received, the eco mode setting unit 702 records into the setting database 703 that the eco mode has been set (S12-a). When the content quality arbitration is done for the actual content playback, the recorded setting information is coded into the distribution request message transmitted from the content requesting unit 704 to the content distribution apparatus 4.

In the present embodiment, although the eco mode setting is stored at the content playback apparatus 7, it may be stored at the service provider (content distribution apparatus 4 or database apparatus 5). In that case, after sequence S11, when the eco mode setting unit 702 receives a notification that an operation for setting the eco mode has been detected, an eco mode setting request is transmitted to the content requesting unit 704, and the content requesting unit 704 transmits setting information to the content distribution apparatus 4 (S12-b). At the content distribution apparatus 4, the session management unit 405 receives the setting information, via the network communication unit 409. Then, the session management unit 405 records the received setting information into the user database 503 (S13-b).

Whether the eco mode setting is stored in the content playback apparatus 7 or stored at the service provider side, although the timing differs, the transmitting of the setting information from the content requesting unit 704 to the content distribution apparatus 4 is the same.

In the present embodiment, the eco mode setting is made regardless of the details of the service supplied from the service provider, this may alternatively be done only when the service provider indicates that it supports the eco mode setting. A method of indicating this may be, for example, coding "Supported: eco-mode" into the header of the HTTP response returned from the content distribution apparatus 4, or may be notification to the content playback apparatus 7 via the returned HTML document or a JavaScript (registered trademark) command.

Additionally, that the eco mode setting is supported may be indicated for each content provided by the content distribution apparatus 4. A method of indicating this may be specification as an attribute of a link regarding the playback of each content (example: <a href="http: . . . " eco="yes">, <a href="http: . . . ?eco=yes">, <a href="sip: . . . ?eco=yes>, or the <object> attribute. In such cases, as long as the eco mode is supported, the control described in the present embodiment may be performed.

Figure 6:
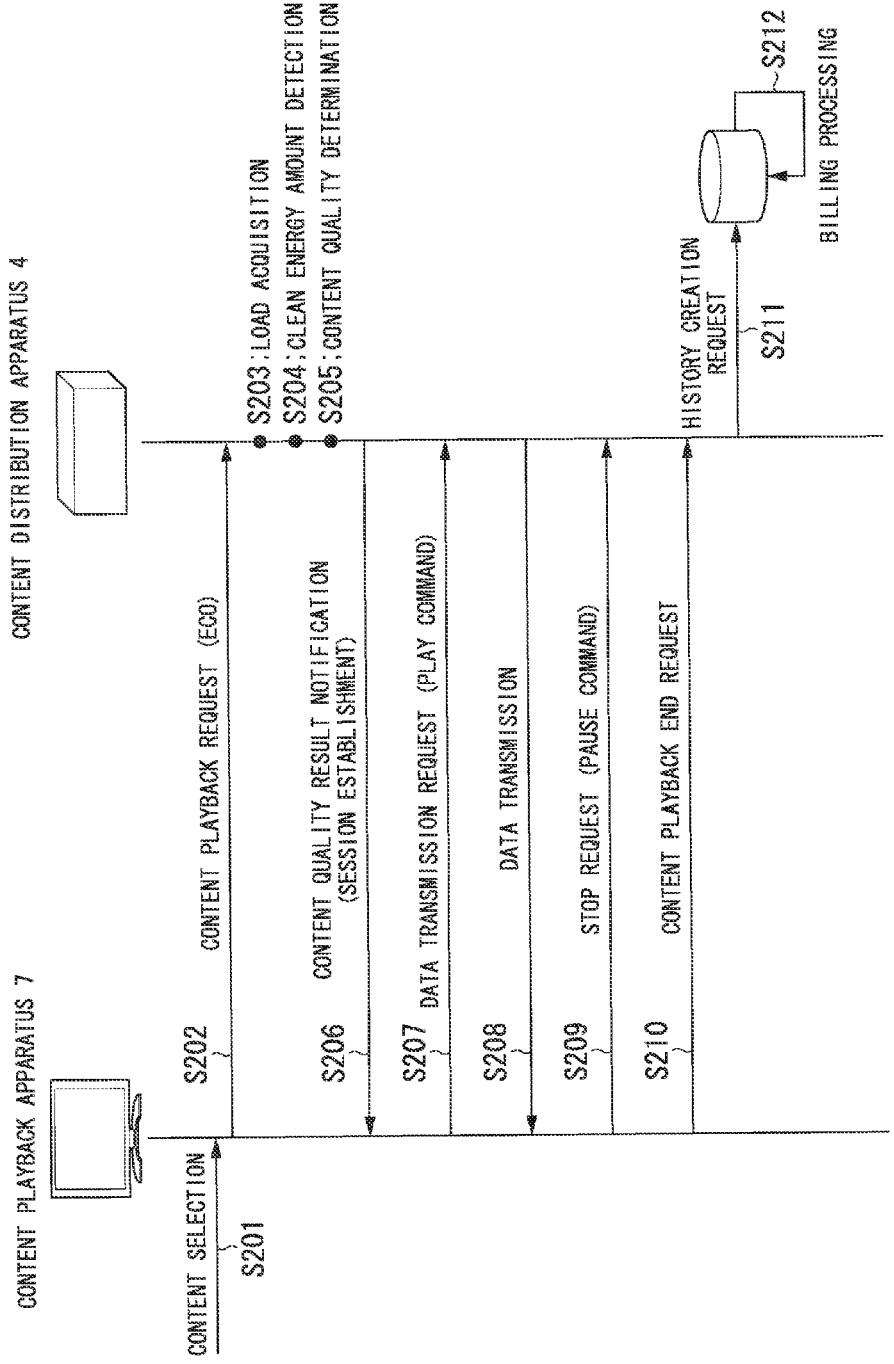
FIG. 6 is a sequence diagram showing the flow of processing when playing back content in the same embodiment.

FIG. 6 is a sequence diagram showing the flow of processing when playing back content. The user input unit 701 of the content playback apparatus 7 detects an operation by user using the remote controller 761 for the purpose of playing back content (S201). Specifically, when this occurs, on a screen that displays a content list that can be distributed by the content distribution apparatus 4, which is a screen displayed by HTML (hypertext markup language) distributed by a part of the content distribution apparatus 4 that is not shown, an operation of selecting one of the list-displayed content is an operation for playing back content. Given this, the user input unit 701 that has detected that operation issues an instruction for playing back to the content control unit 705, which includes the identification information for the content specified by the operation.

Upon receiving the playback instruction, the content control unit 705 generates a content playback request that includes the content identification information included in the received instruction and setting information stored by the setting database 703, and sends these to the content distribution apparatus 4 (S202), via the communication unit 706. For example, the content playback request at this time is a SIP message such as shown in FIG. 7. Also, although the content playback request is given as the example of using SIP, a protocol other than SIP may be used. In this case, the INVITE line (first line) is the command that requests the start of a session in SIP. The From line (second line) indicates the source that transmits the message, that is, the logical name of the user of the content playback apparatus 7. The To line (third line) is an identifier of the message destination, that is, the content, the playback of which is being requested in this case, this being generated based on the content identification information (vod1) specified by selection of content from a displayed list on a screen.

The blank line (fourth line) and thereafter are coded in SDP format. The v, o, s, and t lines (fifth to eight lines) are a header determined by SDP. The m line (ninth line) is a line that indicates the type of medium being requested, and in this case the 33 at the end of the line specifies the MPEG-TS format. The c line (tenth line) represents the network address of the content playback apparatus 7. The b line (eleventh line) is a line that represents the maximum bandwidth that can be processed, and in this case 15000 specifies 15,000 Kbps (kilobits per second). The a=fmtp line (twelfth line) specifies a parameter with respect to the type of medium 33 specified by the m line, and in this case it specifies a parameter based on setting information.

As a parameter based on setting information, in the example of FIG. 7, "eco", "bitrate=2000-", and "brightness=50-" are specified. "Eco" indicates the eco mode, which indicates a request for arbitration of quality that considers a reduction of the amount of carbon dioxide emission. The parameter "bitrate=2000-" in this case indicates at least 2000 Kbps, and "brightness=50-" indicates, if there is content that appears approximately the same with the liquid crystal backlight or projector lamp at less than 100% and at least 50% intensity (and in the case of 50%, the original color information is 200% luminance, that is, the contrast decreases), that content is requested that appears similar with the smallest intensity.

Returning to FIG. 6, the content playback request message (S202) is accepted by the arbitrating unit 404 of the content distribution apparatus 4, via the network communication unit 409. Upon receiving the content playback request message, the arbitrating unit 404 judges whether or not the eco mode is set, based on the message. The arbitrating unit 404 judges that the eco mode has been set, and makes an inquiry to the load detecting unit 403 to detect the load at the server side (content distribution apparatus 4 and database apparatus 5). The load detecting unit 403 obtains from the power sensor 44 the power currently being used by the content distribution apparatus 4 and obtains from the session management unit 405 information indicating the load, issuing notification thereof to the arbitrating unit 404 (S203). Information indicating the load includes the number of sessions currently being served, the number of the overall bit rate being used in distribution, and the statistical average value and the standard deviation of the number of sessions in the same time slot.

In this case, the statistical average value and the standard deviation of the number of sessions in the same time slot is the prescribed determined time slot, that is the average value and the standard deviation of the number of sessions in the past during a time slot including the current time. For example, the time is partitioned into time slots of one hour starting at just on the hour, and if the current time is 19:32, this would be the average value and the standard deviation of the number of sessions in the past one month from 19:00 to 20:00. The number of sessions may be measured once during a time slot, and may be the number of the average value and standard deviation of which are taken, or may be, for example, measured a plurality of times, such as every one minute, during a time slot, and may the number the average value and standard deviation of which are taken. The concepts of the day of the week, a weekday, and a holiday may be included in the same time slot. The average value and standard deviation may be calculated and updated by the session management unit 405, and a priorly calculated value may be set within a program or the like. Time slots need not be a uniformly partitioned time intervals as noted above, and may be differing time intervals, such as finely partitioned time slots when there is frequent changes in the number of sessions and coarsely partitioned time slots when there is little change in the number of sessions.

FIG. 8 is a table showing an example of information acquired by the load detecting unit 403 at the sequence S302 and notified thereby to the arbitrating unit 404. As shown in FIG. 8, the load detecting unit 403 acquires, for example, a current content distribution apparatus power used of 50 kW, a current number of sessions of 500 sessions, a current overall bit rate of 5,000 Mbps, the statistical average number of sessions in the current time slot of 450 sessions, and the statistical standard deviation of the number of sessions in the current time slot of 175 sessions, and makes notification thereof to the arbitrating unit 404.

Next, returning to FIG. 6, the arbitrating unit 404 acquires the amount of clean energy (S204). To do that, the arbitrating unit 404 acquires from the power information management unit 402 supply amount information, which includes the amount of clean energy power used, the amount of unclean energy power used, the amount of clean energy power stored, and the storage rate. FIG. 9 is a table that shows an example of the supply amount information that is acquired by the arbitrating unit 404 from the power information management unit 402. As shown in FIG. 9, the arbitrating unit 404 acquires, for example, an amount of clean energy power used of 50 kW, an amount of unclean energy power used of 0 kW, an amount of clean energy power stored of 50 kWh, and a storage rate of +5 kW.

Next, returning to FIG. 6, the arbitrating unit 404 determines the content quality (content data) so that content distribution is done with only clean energy (S205). That is, the arbitrating unit 404, from among a plurality of content data having different qualities stored in the content database 504 and that are specified by a content playback request, based on the information acquired at sequences S203 and S204 and the relationship, to be described later, between the bit rate and the power used, selects content data so that, even in the case of the expected number of sessions, it is possible to handle the amount of power required for content distribution with clean energy.

FIG. 10 is a table that shows an example of information regarding content data stored by the content database 504. The content database 504, in addition to storing one or a plurality of quality of content data of each content is association with a content ID, as shown in FIG. 10, stores the content IDs of content data, which it stores, the associated bit rates, and brightnesses in association, such that it stores the content ID vod-1, the bit rate of 2000, and the brightness of 100 in association, and stores the content ID vod1-1-60, the bit rate of 2000, and the brightness of 60 in association, and stores the content ID vod1-2, the bit rate of 4000, and the brightness of 100 in association.

In this case, the content data associated with the content ID vod1-1 to vod1-4 are all the same content data indicated by the content ID information vod1, with only the quality differing. For example, whereas the content data of the content ID vod1-1 has a bit rate of 2000 kbps, the content data of the content ID vod1-2 has a bit rate of 4000 kbps. Also, although the content data of the content ID vod1-1 has the usual brightness setting (100%), the content data of the content ID vod1-1-60, when the backlight brightness is 60%, is data that displays with the approximately same brightness as the content data of the content IC vod1-1.

That is, for example, consider data that make each of four white points brightnesses after decoding of (0, 30, 60, 100). When the backlight brightness is 100%, the data corresponding to the above-noted points is (0, 30, 60, 100) as is. If the data for the above-noted points when the backlight brightness is 60% is made (0, 50, 100, 100), the actual brightnesses would be, respectively, (0, 30, 60, 60), that is, it would be possible to display with substantially the brightnesses intended at the distributing side. However, because a point to be intrinsically identified brightest is not identified as such, so that the fourth point is displayed as a brightness of 60 instead of 100, and the phenomenon called white blow-out occurs, in which parts of a subject that exceed a certain brightness are made totally white, so that the result obtained is better applied to video that is dark overall.

FIG. 11 is a table that shows the relationship between the bit rate and the power used that is stored in the arbitrating unit 404. In the example shown in FIG. 1, the arbitrating unit 404 stores bit rate and, the power used in distribution with the bit rate and information of whether or not the bit mode is allowable in eco mode in association, such that it stores a power used of 10 W and a circle as the usability in eco mode in association with the bit rate of 2000 kbps, stores a power used of 20 W and a circle as the usability in eco mode in association with the bit rate of 4000 kbps, stores a power used of 50 W and a circle as the usability in eco mode in association with the bit rate of 10000 kbps, and stores a power used of 100 W and an X as the usability in eco mode in association with the bit rate of 2000 kbps. In this case, as the usability in eco mode, a circle indicates usability of that bit rate and an X indicate non-usability at that bit rate.

Next, returning to FIG. 6, the arbitrating unit 404 transmits the result of the determination of the content quality to the content playback apparatus 7 (S206). Additionally, following an instruction of the arbitrating unit 404, the session management unit 405 stores the content quality determination result into the user database 503 and establishes a session. FIG. 12 shows an example of the SIP message transmitted by the arbitrating unit 404, which notifies of the content quality determination result. In FIG. 12, the SIP/2.0 200 OK line (first line) indicates that the INVITE request shown by example in the first line of FIG. 7 succeeded. Although the other lines are the same as in the SIP message in FIG. 7, a characteristic part that is different from FIG. 7 is the a=fmtp:33 in the twelfth line, in which eco=2 indicates setting of the environmental index of 2, bitrate=4000 indicates setting of the bit rate to 4000 kbps, and brightness=60 indicates setting of the content data in which the brightness setting is determined as 60.

Another difference is a=fmtp:33 uri= . . . ; session= in the eleventh line. What is returned here as parameter is the identifier used when sending a video playback control request such as the start and the pause of playback. Although RTSP (Realtime Streaming Protocol: RFC 2326) is used as the identifier, such as uri=rtsp: ---, this is not a particular restriction, and an arbitrary protocol that is capable of performing playback control may be used. The IP address 100.1.1.100 that is specified by uri=rtsp://100.1.1.100 is the address of the content distribution apparatus 4, and is usually the same as the transmission destination of the SIP message in FIG. 7. However, depending upon the constitution of the content distribution apparatus 4, there are cases in which the server apparatus for transmitting and receiving the SIP message and the server apparatus for transmitting and receiving the RTSP message differ, in which case the IP addresses might be different.

The message that gives notification of this content quality determination result is received by the content requesting unit 704 of the content playback apparatus 7 and, in accordance with the details of the message, instruction is given to the content control unit 705 for parameter settings with respect to the video output unit 708 and the audio output unit 709, and for transmission of the playback start request (S207). For example, in accordance with brightness=60 in the message, a setting so that the backlight output is 60% is given as an instruction to the video output unit 708. Also, although in this case the playback start request is, for example, an RTSP PLAY command or the like, it may alternatively be a playback start request in accordance with another protocol. When the session management unit 405 of the content distribution apparatus 4 receives the playback start request, the content management unit 406 of the content distribution apparatus 4 reads out the content data of the quality specified by the SIP message of FIG. 12 from the content database 504 and distributes it (S208). The distributed content data is received by the data receiving unit 707 of the content playback apparatus 7, which forwards it to the video output unit 708 and the audio output unit 809, so as to output the video and the audio of the content. After that, the content control unit 705, by transmitting a distribution stop request (S209) and a content playback end request (S210; session end request) to the content distribution apparatus 4, the session is ended.

When the session is ended, by an instruction issued by the session management, the history management unit 407 of the content distribution apparatus 4 creates and stores in the history database 502 history information regarding the session that distributed content (S211). FIG. 13 is a table that shows an example of history information stored by the history database 502. As shown in the example of FIG. 13, the history database 502 stores history information for each session into a record constituted by a user ID, a viewing date, a content ID, a viewing time, and the environmental index, storing the user ID alice, the viewing date 11/3, the content ID vod12-3, the viewing time 120 minutes, and the environmental index of 3 in association, and storing the user ID alice, the viewing date 11/4, the content ID vod5-2, the viewing time 60 minutes, and the environmental index of 2 in association. The viewing date may include not just the date, but also the time.

FIG. 14 is a table showing the relationship between the power used, the average surplus power, the environmental index, and the billed amount (unit price). The history management unit 407 determines the environmental index for each session using the ratio between the used power and the average surplus power and the relationship to the environmental index, and takes this as history information. The billing processor 408, using the relationship between the environmental index and the billed amount (unit price), performs billing processing. The average surplus power, details of which are given later, is the value of the surplus clean energy divided by the difference between the expected maximum number of sessions (predetermined maximum load) and the current number of sessions. In the relationship between the power used by a new session and the average surplus power, if the power used falls within the surplus power, because there is no eco violation, the smaller is the proportion of the power used with respect to the surplus power, the greater is the profit to the provider, and it is thought that this incentive should accrue to the user as well. In accordance with this idea, the relationship between the environmental index (degree of energy savings) and the unit price is predetermined, for example, as shown in FIG. 14.

That is, if the power used with respect to the average surplus power is very small, the proportion being 0.1 or smaller, because the contribution to energy savings is high, the environmental index is made 3, and the unit price per hour is 40 yen. If the proportion of the power used with respect to the average surplus power exceeds 0.1 but is no greater than 0.5, the environmental index is made 2, and the unit price per hour is 60 yen. If the proportion of the power used with respect to the average surplus power exceeds 0.5 but is no greater than 1, the environmental index is made 1, and the unit price per hour is 80 yen. If the proportion of the power used with respect to the average surplus power exceeds 1 or the average surplus power is zero, the environmental index is made 0, and the unit price per hour is 100. However, these settings may be made arbitrarily by the operating policy of the operator.

For example, if the average surplus power is 40 W and the content data having the content ID of vod1-2-60 is distributed, because, as shown in FIG. 10, the bit rate for this content data is 4000 kbps, from FIG. 11 the power used is 20 W. Therefore, (power used)/(average surplus power)=20/40=0.5 and, from FIG. 14, the environmental index is 2 and the unit price is 60 yen. Although there are the four steps of environmental indices 0 to 3 in this case, there is no restriction to four steps, and the number of steps may be made greater or fewer than four, and may alternatively be a continuous value, calculated using a predetermined equation that uses the power used and the average surplus power as parameters. With regard to the billed amount (unit price) as well, a continuous value may be used in the same manner, or a number of steps can be provided, using threshold values.

With regard to the brightness setting of 60, because there is no particular influence on load of the operator side, there is no need to provide an incentive such as a reduction in the billed amount. This is something that mainly contributes to a reduction in the power consumption of the content playback apparatus 7, which at that point is already provided as a benefit to the user.

Next, returning to FIG. 6, the billing processor 408 of the content distribution apparatus 4, based on the history information stored by the history database 502, calculates the billed amount for each user, as the monthly service fee for each month one time monthly, and stores this into the billing database 501 (S211). FIG. 15 is a table that shows an example of billed amounts for each user stored by the billing database 501. As shown in FIG. 15, the billing database 501 stores, in association, for example, the user ID Alice, the billing month of 2009/11, the non-eco viewing time of 60, the non-eco billed amount of 100, the eco=1 viewing time of 60, the eco=1 billed amount of 80, the eco=2 viewing time of 180, the eco=2 billed amount of 180, the eco=3 viewing time of 120, the eco=3 billed amount of 80, and the total billed amount of 440. The user IDs, billing month, non-eco viewing time, non-eco billed amount, the viewing times and billed amounts for eco=1, 2, and 3, and the total billed amount are stored for other users as well. The billing processor 408 generates invoices based on the data stored by the billing database 501 and, based on the invoices, the operator settles payment, by a method such as requesting a bank account debit, sending an invoice to a credit card company, or sending an invoice to a user.

Figure 16:
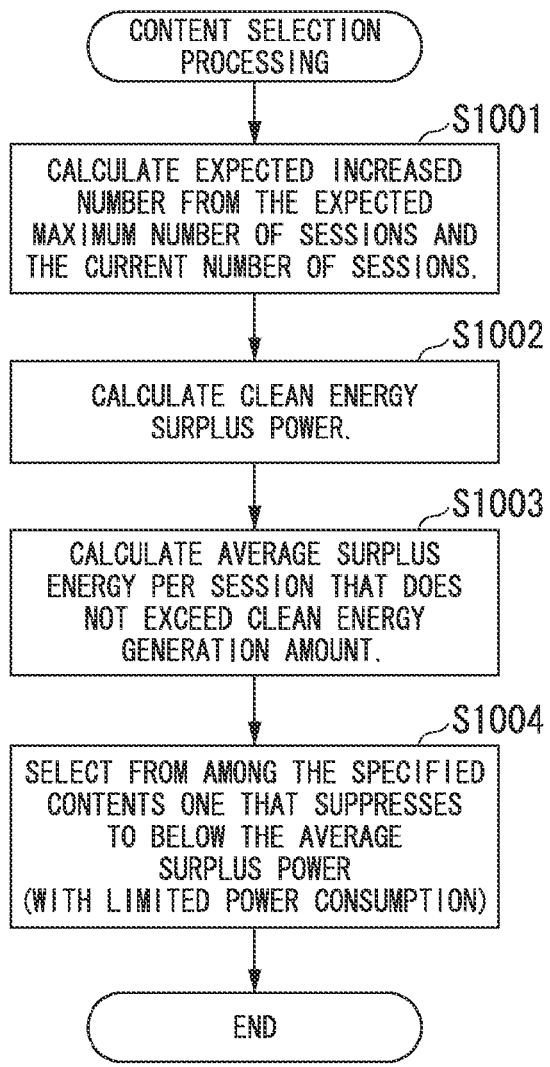
FIG. 16 is a flowchart showing the processing of the arbitrating unit 404 determining the content quality in the same embodiment.

FIG. 16 is a flowchart that describes the processing for content quality determination by the arbitrating unit 404. The processing for content quality determination is the processing performed at sequence S205 in FIG. 6, which is performed by the arbitrating unit 404, while making inquiries of data to the power information management unit 402, the load detecting unit 403, and the session management unit 405. First, the arbitrating unit 40, calculates, from the expected maximum number of sessions and the current number of sessions, the expected increase in number (S1001). The expected maximum number of sessions in this case is simply calculated as the sum of the average value and standard deviation of the number of sessions notified from the load detecting unit 403 for the same time slot. For example, if notification is made of the information such as shown in FIG. 8, the expected maximum number of sessions is 450+175=625. This is a value that can be said to indicate that the number of sessions will be no greater than 625 with a probability of 68% from the statistical viewpoint. The expected increase in number is the value obtained by subtracting the current number of sessions from the expected maximum number of sessions, which is 625−500=125. The calculation of the expected increase in number is not restricted to this. For example, the expected increase in number may be optimized as appropriate, by taking the difference obtained by subtracting the current number of sessions from the expected maximum number of sessions and multiplying the resulting value by a coefficient, which is varied based on the usage condition to improve the accuracy.

Next, the arbitrating unit 404 calculates the surplus power of clean energy (S1002). The clean energy power generated is the sum of the clean energy power used amount notified by the power information management unit 402 and the storage rate. For example, if the supply amount information such as shown in FIG. 9 is obtained from the power information management unit 402, this would be 50+5=55 kW. Then, the surplus power would be the value obtained by subtracting the currently used power from the clean energy power generated amount, this being 55−50−0=5 kW. That is, the rate of storage into the storage battery 37 is taken to be the surplus power. In this case, although the surplus power can be accurately derived because there is the storage battery 37, if no storage battery 37 is provided, a prediction is made using another method. For example, there is the method of temporarily increasing the used power by some method and detecting whether or not unclean energy is used at that time and, if it is not used, predicting that there is surplus power, and the method of pre-setting the average amount of power generated in accordance with the specifications of the solar photovoltaic panel 2 (which may be statistical determination based on past performance) and calculating the difference with respect thereto. Also, the detection of the surplus power may be done by the power information unit 301 or the like of the power controller 3, with notification being given to the content distribution apparatus 4, with the detected surplus power being included in the supply amount information.

Next, the arbitrating unit 404 calculates the average amount of surplus power per session that does not exceed the clean energy generation amount (S1003). That is, the surplus power is divided by the expected increase in number, which in this case would be 5/125=0.04 kW=40 W. Next, the arbitrating unit 404 obtains from the content management unit 406 information regarding the content data of the specified content and selects the content data that suppresses to no greater than the average surplus power (S1004). The suppression of the power consumption to no greater than 40 W is, from the relationship between the bit rate and the power used shown in FIG. 11, when the bit rate is 4000 kbps or lower. Additionally, the arbitrating unit 404 selects a bit rate that satisfies the bit rate conditions specified by a content playback request at the sequence S202.

For example, because the content playback request message of FIG. 7 specifies 2000 kbps or greater, the conditions are at least 2000 kbps and no greater than 4000 kbps. In this case, information regarding the content identifier is vod1, and for the case of the information regarding content data as shown in the example in FIG. 10, the content data with a bit rate of 2000 kbps or greater and no greater than 4000 kbps is any one of the content data having the content IDs of vod1-1, vod1-1-60, vod1-2, and vod1-2-60.

Although which of the selections from 2000 kbps and 4000 kbps the arbitrating unit 404 selects may be determined by the operator policy, or alternatively may be determined based on a separate parameter, it is desirable that the arbitrating unit 404 select 4000 kbps, which has higher quality. By making a selection that has a higher quality, it is possible to suppress the imparting of an unnatural feeling to the user. Also, because brightness=50 is set by the content playback request of FIG. 7 in the same manner, with the brightness setting as 60, the arbitrating unit 404 selects the content data having the content ID of vod-1-2-60.

Figure 17:
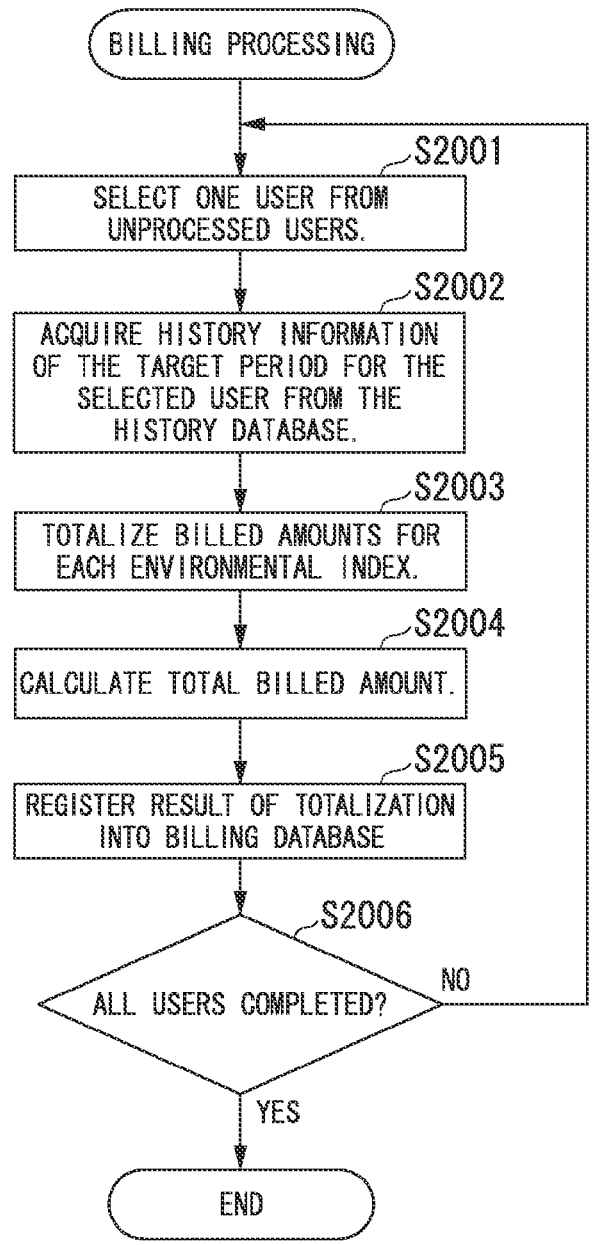
FIG. 17 is a flowchart describing the billing processing by the billing processor 408 in the same embodiment.

FIG. 17 is a flowchart that describing the billing processing by the billing processor 408. The billing processing is processing that is performed at the sequence S212 in FIG. 6. First, the billing processor 408 selects one billing processing from among the unprocessed users (S2001). This selection criterion may, for example, be done in the sequence of user ID, or in the sequence of records, or in a random sequence. Next, the billing processor 408, with regard to the user selected at the step S2001, obtains the history data for the billing period of interest from the history database 502 (S2002). For example, for the history information for which the user ID is alice in FIG. 13, there are five items that are obtained if the period of interest is November.

Next, the billing processor 408 calculates the billed amount for each environmental index (S2003). In the example of FIG. 13, the billed amount for the environmental index of 0 (non-eco) is 60 minutes×100 yen/60 minutes=100 yen, the billed amount for the environmental index of 1 is 60 minutes×80 yen/60 minutes=80 yen, the billed amount for the environmental index of 2 is 180 minutes×60 yen/60 minutes=180 yen, and the billed amount for the environmental index of 3 is 120 minutes×40 yen/60 minutes=80 yen. Next, the billing processor 408 sums the billed amounts for each environmental index calculated at step S2003 and calculates the total billed amount (S2004). In the example of FIG. 13, this is 100 yen+80 yen+180 yen+80 yen=440 yen. Next, the billing processor 408 stores the calculation results from steps S2003 and S2004 into the billing database 501 (S2005). Then, the processing from step S2001 to S2005 is repeated until it is done for all the users (S2006).

In this case, although the billed amount is simply calculated by metered billing by the viewing hours, other arbitrary billing methods are possible. For example, a flat rate of 5000 yen with unlimited eco mode viewing may be adopted. Even in that case, the billing processor 408 calculates the billed amount based on history information in the history database 502.

Also, in this case the level of the bit rate of the content is used in the calculation of the environmental index. This is added bandwidth for the purpose of the FEC (forward error correction) function. When the FEC function is used, in addition to the content data, 10% to 20% data is usually required to be added for error correction, thereby resulting in added bandwidth. For example, if the bit rate of the content itself is 2000 kbps and the FEC bit rate is 200 kbps, when FEC is used, the content bit rate becomes 2200 kbps. Therefore, because the bit rate is smaller and the power consumption is decreases if FEC is not transmitted, the bit rate may be made to change, depending upon whether or not FEC is added. Whether or not FEC is required is indicated, for example, by the m line in SDP (it being used if there is an m line).

Also although in this case the arbitration result is caused to be reflected in the form of the level of the bit rate, this is not a restriction. Although the bit rate has a direct influence on the power used by the content distribution apparatus 4, because if the amount of clean energy generated changes without a change in the power used, the environmental index changes, the environmental index may be determined without regard to the used power. For example, if the environmental index tends to always be high in the Sahara Desert, which is distant from Japan, there are cases in which the operator wishes to select that (although a sacrifice by the user will be necessary because of slow response), it can be envisioned that some compensating incentive is given to the user.

Also, although in step S1002 of FIG. 16 pure surplus clean energy power is envisioned, the surplus power may be through of as including grid power 1, with the idea that some grid power 1 may be used. For example, with the idea that up to 100 W of grid power 1 may be used, if the clean energy surplus power is 0 W, the surplus power would be taken to be 100 W, and if the clean energy surplus power is 50 W, the surplus power would be taken to be 150 W. This is because grid power 1 includes power by wind power generation and geothermal power generation, and the like, so that grid power 1 is not strictly equivalent to being non-eco, and because some reliance on grid power 1 is reasonably appropriate in reality. Additionally, if the storage battery 37 is not provided in this case, without doing special processing to calculate the surplus power, the value of surplus power from the grid power 1 that it is thought to be acceptable is used as the surplus power in making the calculation at step S1003.

In the present embodiment, although carbon dioxide emission is thought of as being the environmental load, and the content distribution apparatus 4 determines the bit rate so that the carbon dioxide emission is zero, that is, so that only clean energy is used in distributing content, the bit rate may be alternatively determined so that suppression of carbon dioxide emission amount is done to a predetermined emission value per unit time, or so to a predetermined emission value per unit of generated power amount. For example, a case can be envisioned in which the amount of carbon dioxide emission per unit time is taken as being 1 kg/hour. If with regard to the solar photovoltaic panel 2, the carbon dioxide emission amount per unit of generated power is 0 kg/kWh, and the suppliable power is 45 kW, and with regard to the grid power 1 the amount of carbon dioxide emission per unit of generated power amount is 0.4 kg/kWh, if the total power used is XkW, it is sufficient that 45 kW×0 kg/kWh+(X−45) kw×0.4 kg/kWh=1 kg/hour be satisfied. That is, power can be used up to X=47.5 kw. Also, in this case power may be supplied not only the two power sources of the solar photovoltaic panel 2 and the grid power 1, but from three or more power sources with different environmental loads.

Although in the present embodiment the bit rate is determined so that it is possible to handle the power used by the content distribution apparatus 4 as the target with only clean energy, the bit rate may be determined so as to enable handling of the power used by the content distribution apparatus 4 and the database apparatus 5 with only clean energy. Additionally, the power used by the switching apparatus 10 can also be made a target when determining the bit rate so that the power used is handled by clean energy only.

Although in the present embodiment the power used by the content playback apparatus 7 is not considered, it may be considered. That is, the power used that is responsive to the bit rate is set into the content playback apparatus 7 beforehand, and data, for example, of "a=fmtp:33 terminal=10 W/Mbps" (10 W used per 1 Mbps) is entered into the SIP message of FIG. 7, and this value is considered when the server-side power used is calculated. It is desirable that the used power considers not only that of the content playback apparatus 7, but also other household equipment such as LAN routers for which the power used varies in accordance with the bit rate of a wireless LAN or the like, and desirable that user be able to easily make free settings from a menu screen or the like.

In this manner, because the content distribution apparatus 4 of the present embodiment varies the service quality, such as the bit rate, so that the power used in content distribution to a user desiring distribution is handled by clean energy, it is possible to perform content distribution that is consistent with environmental protection, such as reducing carbon dioxide emission, while suppressing an unnatural feeling for the user.

[Second Embodiment]

Figure 18:
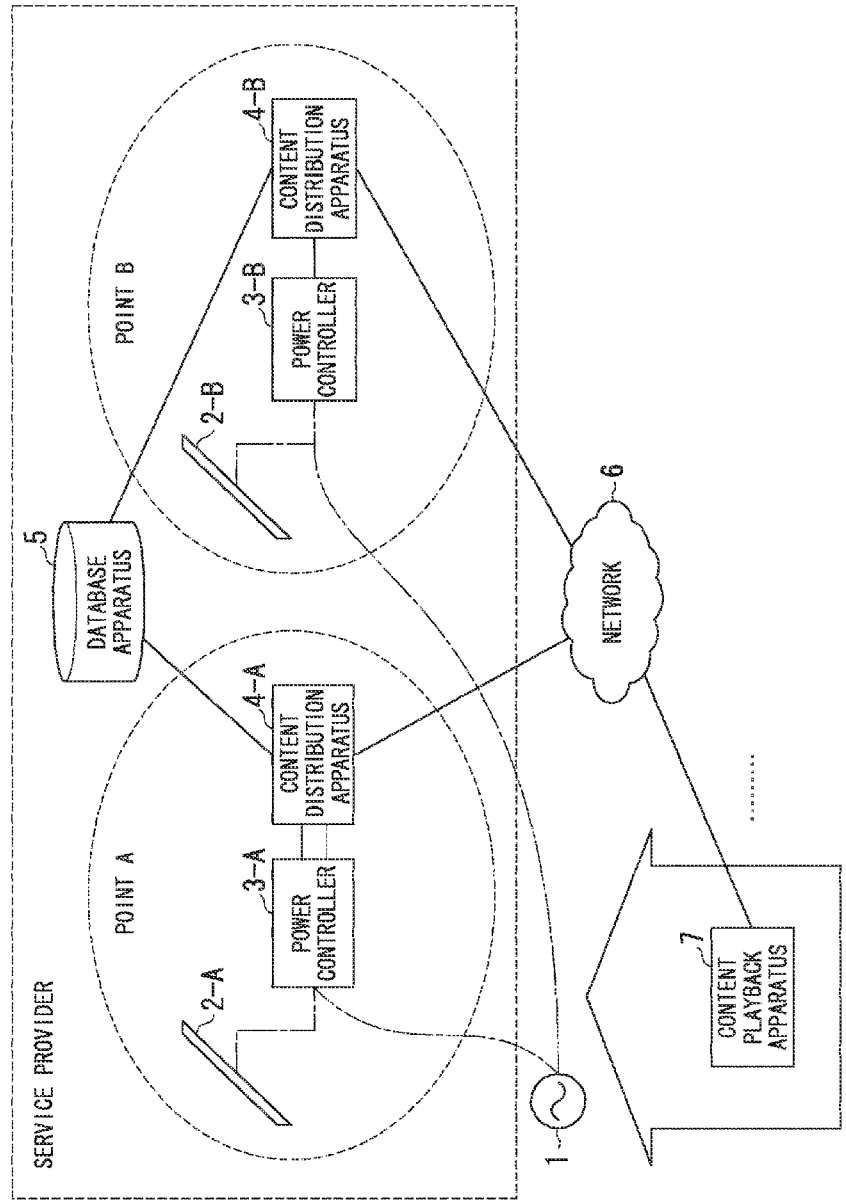
FIG. 18 is a conceptual drawing showing the constitution of a content distribution system according to a second embodiment of the present invention.

In the first embodiment, the content distribution apparatus 4 is installed at one location, whereas in the second embodiment the content distribution apparatus 4 is installed at a plurality of locations on the earth. FIG. 18 is a conceptual drawing showing the constitution of a content distribution system of the present embodiment. The content distribution system of the present embodiment has the grid power 1, solar photovoltaic panels 2-A and 2-B, power controllers 3-A and 3-B, content distribution apparatuses 4-A and 4-B, the database apparatus 5, the network 6, and a plurality of content playback apparatuses 7. As shown in FIG. 18, in the present embodiment, the service provider installs the solar photovoltaic panel 2-A, the power controller 3-A, and the content distribution apparatus 4-A at point A and installs the solar photovoltaic panel 2-B, the power controller 3-B, and the content distribution apparatus 4-B at point B. The database apparatus 50 has connected thereto the content distribution apparatuses 4-A and 4-B, and is installed at a location other than points A and B. Also, the database apparatus 50 may be installed at either of the points A and B. In the present embodiment as well, although, as is shown in FIG. 1, an Ethernet (registered trademark) switching apparatus 10 is installed at each location, this is not illustrated in this case.

The solar photovoltaic panels 2-A and 2-B are the same as the solar photovoltaic panel 2 of the first embodiment shown in FIG. 1. The power controllers 3-A and 3-B, with the exception of supplying power to the database apparatus 5, are the same as the power controller 3 of the first embodiment shown in FIG. 1. If the database apparatus 50 is installed at either of the point A and the point B, the power controller at each of the locations may supply power to the database apparatus 5.

Figure 19:
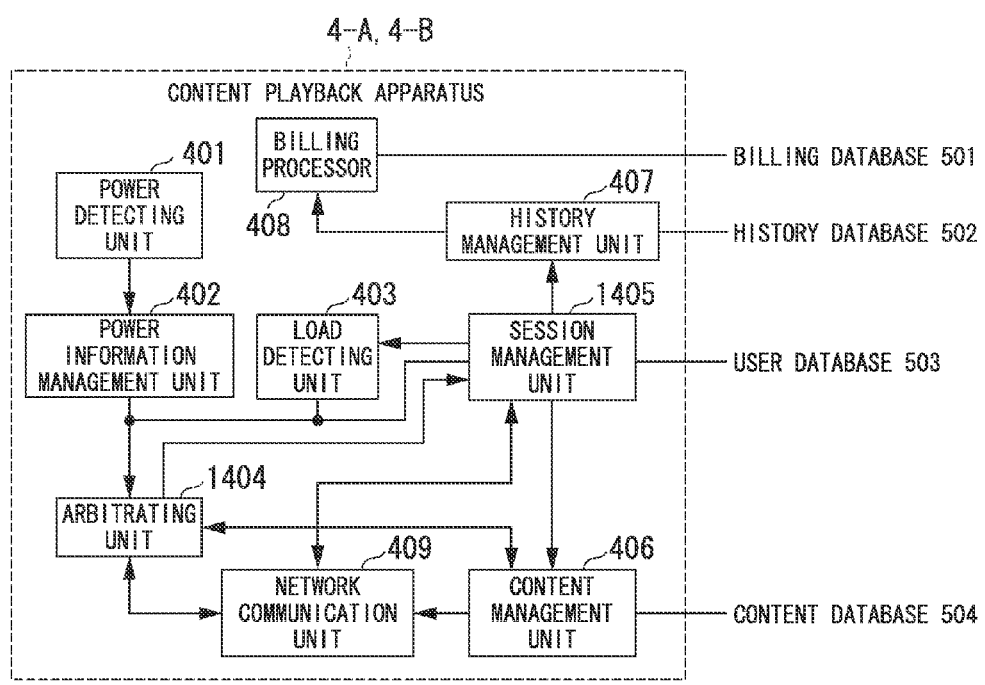
FIG. 19 is a functional block diagram showing the constitution of content distribution apparatuses 4-A and 4-B in the same embodiment.

FIG. 19 is functional block diagram showing the constitution of the content distribution apparatuses 4-A and 4-B. The content distribution apparatus 4-A and the content distribution apparatus 4-B, with the exception of having an arbitrating unit 1404 in place of the arbitrating unit 404 and having a session management unit 1405 in place of the session management unit 405, have the same constitution as the content distribution apparatus 4. The arbitrating unit 1404 and the session management unit 1405, in comparison with the arbitrating unit 404 and the session management unit 405, is different in that they have a function that enables accommodation of servers in multiple locations.

The point A and the point B may be, for example, locations on the earth such as Japan and Europe, which have evening and day time zones reversed, and one may be the Sahara Desert or the like, where even if a user home where the content playback apparatus 7 is located is distant, the probability of clear weather is high, making it suitable for the power generation using a solar photovoltaic panel. If the user, that is the content playback apparatus 7, is in Japan, a content distribution apparatus that is geographically closer or closer on the network, that is, the content distribution apparatus 4-A will have faster response with respect to a request from the content playback apparatus 7, and will be able to provide service with higher quality.

FIG. 20 is a sequence diagram that shows the flow of processing when content is played back. First, sequences S1201 and S1202 are the same as sequences S201 and S202 in FIG. 6. The content playback apparatus 7, of the content distribution apparatuses 4-A and 4-B, transmits a content playback request to the apparatus that is either geographically closer or closer on the network. In this case, the transmission is done to the content distribution apparatus 4-A. Next, the arbitrating unit 1404 of the content distribution apparatus 4-A, upon receiving the content playback request at the sequence S1202, forwards a received message that is the same as the content playback request (FIG. 7) to the content distribution apparatus 4-B as well. Having done this, both the content distribution apparatuses 4-A and 4-B perform the same processing as at sequences S203 to S205 in FIG. 6 (sequences S1204-A to S1206-A and sequences S1204-B to S1206-B, respectively).

At the sequences S1204-A to S1206-A and sequences S1204-B to S1206-B, although the amount of load and amount of clean energy at each of points A and B are detected, in this case the load amounts detected by the load detecting unit 403 for both are the same value as shown in FIG. 8, and with only the values of clean energy amounts obtained by the power information receiving units 402 being different, at the sequences S1205-A and S1205-B, examples of the clean energy used amounts and the like for the content distribution apparatus 4-A at the point A and the content distribution apparatus 4-B at the point B are shown in FIG. 21. At the point A, the clean energy used power is 40 kW, the amount of unclean energy power used is 5 kW, and there is no surplus power. At the point B, the clean energy used power is 50 kW, the unclean energy power used is 0 kW, and there is approximately 10 kW of surplus power, which is accumulated in the storage battery 37. As a result, the average surplus powers are, respectively, 0 W and 80 W. The content data selected by the arbitrating unit 1404 of each of the content distribution apparatuses 4-A and 4-B are the content data having the content ID of vod1-1-60 (power consumption of 10 W and environmental index of 0) and the content ID of vod1-3 (power consumption of 40 W and environmental index of 1).

Next, the arbitrating unit 1404 of the content distribution server 4-B notifies the arbitrating unit 1404 of the content distribution apparatus 4-A of the content quality of the content data determined at the sequence S1206-B, for example, by making it a content quality result notification message such as shown in FIG. 22 (S1207). Additionally, the content distribution apparatus 4-B stores the details of the content quality result notification into the user database 503 and establishes a session. The content quality result notification message of FIG. 22 differs from the message of FIG. 12 with regard to the point that, in the a line that is the twelfth line, "eco=1;flexible;bitrate=2000-;brightness=5-" (environmental index of 1) is specified, and that the address indicated by "a=fmtp:33 uri=." and the like is the IP address of the content distribution server 4-B, which is 100.2.1.100.

Next, the arbitrating unit 1404 of the content distribution apparatus 4-A, upon receiving the notification of the message at the sequence S1207, compares the environmental indices of the results determined by the content distribution apparatuses 4-A and 4-B, and performs judgment processing to select the one with the higher environmental index (S1208).

Although in the above-described example the environmental index of the content distribution apparatus 4-B is the higher, when the content distribution apparatus 4-A is selected in this judgment processing, a content playback end request (SIP BYE message or the like) to cancel the establishment of the content distribution apparatus 4-B session is transmitted to the content distribution apparatus 4-B (S1250). Upon receiving the content playback end request, the session management unit 1405 of the content distribution apparatus 4-B deletes the session information stored in the user database 503, and releases the session. Also, when this occurs, because the content distribution apparatus 4-B can judge that the source of the transmission of the request is the content distribution apparatus 4-A by looking at the packet originating address, the judgment is made that there is no content distribution history, and no history is created. Next, the arbitrating unit 1404 of the content distribution apparatus 4-A transmits the content quality result notification to the content playback apparatus 7 (S1251) and also, in accordance with an instruction from the arbitrating unit 1404, the session management unit 1405 stores the content quality result notification details into the user database 503 and establishes the session (S1251). Thereafter, operation similar to the sequences S207 to S212 of FIG. 6 is performed between the content distribution apparatus 4-A and the content playback apparatus 7. The sequences S207 to S212 are omitted in FIG. 20.

As noted in the above-described example, the environmental index of the content distribution apparatus 4-B is the higher and, in the judgment processing at the sequence 1208, if the content distribution apparatus 4-B is selected, the arbitrating unit 1404 of the content distribution apparatus 4-A cancels the processing for establishing a session with respect the content play request at the sequence S1202 (internal arbitrating unit 1404 processing), and the session is deleted (S1260). Next, the arbitrating unit 1404 forwards the content quality result notification message received from the content distribution apparatus 4-B as is to the content playback apparatus 7 and establishes the session (S1261). When this occurs, following an instruction from the arbitrating unit 1404, the session management unit 1405 adds information that indicates that the session is via distribution from the content distribution apparatus 4-B, stores the content quality result notification received from the content distribution apparatus 4-B into the user database 503, and establishes the session.

The content playback apparatus 7, by referencing the address in the content quality result notification message when operating, can operate without considering which of the content distribution apparatuses 4-A and 4-B is selected. Because the address for distribution control included in the content quality result notification message (FIG. 22) is 100.2.1.100, by using this address as the transmission destination for the request, requests such as RTSP PLAY, PAUSE are issued to the content distribution apparatus 4-B and playback of video is done (S1262).

When stopping the playback of content, the content playback apparatus 7 transmits a content playback end request to the apparatus that transmitted the content playback request at the sequence S1202, which in this case is the content distribution apparatus 4-A (S1263).

Upon receiving the content playback end request, because the session management unit 1405 of the content distribution apparatus 4-A knows that the distribution by the content distribution apparatus 4-B is being mediated, the content playback end request is forwarded to the content distribution apparatus 4-A (S1264). The session management unit 1405 of the content distribution apparatus 4-B receives the forwarded content playback end request, performs session ending processing, and performs processing for the creation of a history, in the same manner as in the sequence S211 of FIG. 6. (However, because both of the content distribution apparatuses 4-A and 4-B can judge that this is a session that is being mediated by the content distribution apparatus 4-A, the processing for history creation may be performed at the content distribution apparatus 4-A side.)

Also, the content playback request at the sequence S1202 may be made to include information indicating whether or not the apparatus to distribute the content data may be decided at the content distribution apparatus side.

When this information indicates that the determination can be made at the content distribution apparatus side, processing is performed to select an appropriate content distribution apparatus from a plurality of content distribution apparatuses, as described above, and if that is not the case, the content distribution apparatus that received the content playback request distributes the content data.

Also, although in the present embodiment the description is for content distribution apparatuses being disposed at the two points A and B, content distribution apparatuses may be disposed at three or more locations.

For example, in the case in which content distribution apparatuses are disposed at the three locations A, B, and C, the content distribution apparatus that received a content playback request forwards the content playback request to the remaining two content distribution apparatuses. Additionally, the content distribution apparatus that is to distribute the content is selected based on the environmental indices of the three content distribution apparatuses.

In this manner, because a selection is made from among content distribution apparatuses disposed at a plurality of locations so that the power used for content distribution can be handled by clean energy, it is possible to perform content distribution while suppressing the environmental load, such as the emission of carbon dioxide. Also, by this selection, the service quality, such as the response time or the like, which is affected by the relationship to the location at which the selected content distribution apparatus is disposed can be selected.

[Variation Example of First Embodiment]

Although in the above-described first embodiment the content quality is determined, a history of a session (for playing back content) is created, and billing is performed, in the present variation example, the quality is changed midway in playing back one content. This is done when it is not possible to handle power for content distribution by using only clean energy, for example in a case in which the load amount increases due to an unexpected excessive number of sessions at the content distribution apparatus side midway during playing back of content or due to unexpected excessive decrease of the supply amount of the clean energy. In the present variation, although the constitution of each unit is basically the same as in the first embodiment, because the arbitrating unit 404 and the content management unit 406 of the content distribution apparatus 4 are different from the first embodiment, these will be mainly described below.

FIG. 23 is a sequence diagram describing the dynamic change in content quality during a session in the variation example. Although sequences S301 to S308 are basically the same as the sequences S201 to S208, the difference is that the content playback apparatus 7 sets a parameter of "flexible" in the line of "a=fmt:33" in each message transmitted in the sequences S302 and S306 as shown in lines 12 of FIG. 24 and in lines 12 of FIG. 25. The "flexible" is a parameter indicating that dynamic change in quality is possible during the distribution of content data.

Next, assume that some event regarding a request for the change in quality occurs. Then, the arbitrating unit 404 detects the occurrence of the event (S309). The arbitrating unit 404 detects this event based on load information such as the number of sessions acquired from the load detecting unit 403 and supply amount information such as clean energy power used acquired from the power information management unit 402. When the event is detected, the arbitrating unit 404 determines the change in content quality and transmits the content quality change request, including information that indicates the quality resulting from the determination to the content playback apparatus 7 (S310). Upon receiving the content quality change request, the content playback apparatus 7 performs any processing that is necessary accompanying the change in quality, and responds to the content quality change request (content quality change result notification) (S311). This response, for example, is the SIP 200 OK message. As necessary processing accompanying the change in quality, processing that can be cited includes a change in a parameter setting such as the bit rate with respect to a decoder of content data provided by the data receiving unit 707.

When the content quality change result notification is received, the session management unit 405 reflects the content of change in quality in session information stored by the user database 503, and the history management unit 407 creates history information with respect to duration of the same bit rate, storing it into the history database 502 (S312). This processing is the same as the sequence S211 shown in FIG. 6. Switched content data is transmitted at S313. Because subsequent processing is the same as that after S209, the description thereof is omitted (although the billing processing of S211 is done with respect to the session after switching).

Figure 26:
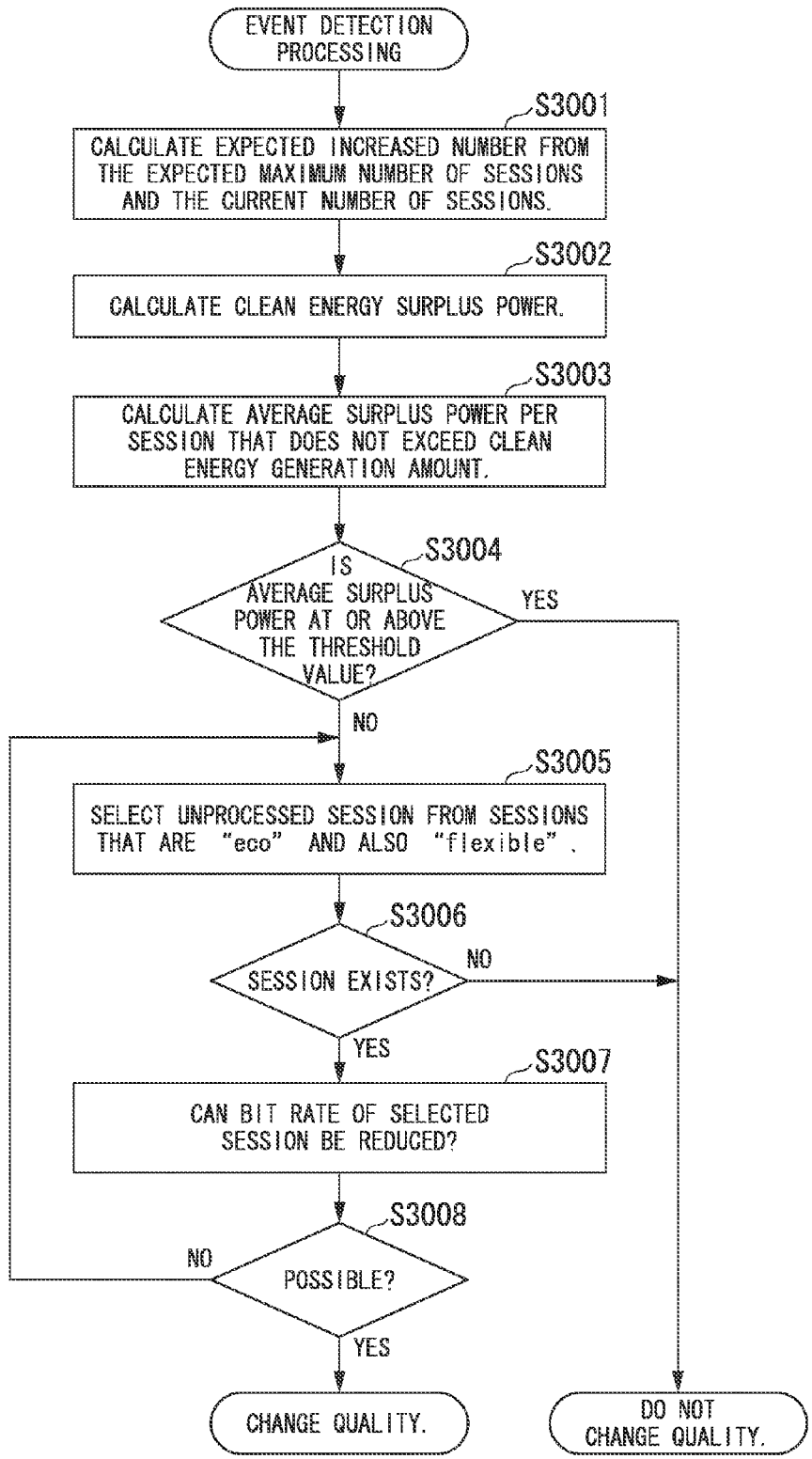
FIG. 26 is a flowchart describing the detection processing an event by the arbitrating unit 404 in the same variation example.

FIG. 26 is a flowchart describing the detection processing of an event by the arbitrating unit 404.

The arbitrating unit 404 periodically executes this processing separately from processing of requests from the content playback apparatus 7. At the steps S3001 to S3003, the same processing as in the steps S1001 to S1003 of FIG. 16 is done, so that average surplus power X that is the power per session that does not exceed clean energy generation amount as a result is calculated. Next, the arbitrating unit 404 judges whether or not the average surplus power X exceeds a prescribed threshold value (S3004). If the power exceeds the threshold value (surplus power is sufficient) (Yes at S3004), it is determined that the quality does not change, and the processing is completed. However, if the power is no greater than the threshold value (that is, if the surplus power is insufficient) (No at S3004), the processing proceeds to the step S3005.

At the step S3005, the arbitrating unit 404 references the session information acquired from the user database 503 by the session management unit 405 and selects an unprocessed session from the sessions in which "eco" and "flexible" are set. If a corresponding session does not exist (No at S3005), it is determined that the quality is not changed, and the processing is completed. However, if a corresponding session exists (Yes at S3005), the arbitrating unit 404 proceeds to the step S3007, and issues an inquiry to the content management unit 405 regarding whether or not further sessions having a low bit rate exist among the content data that is the same as content that is currently being played back and also content data that satisfies conditions set by the content playback request. For example, if the content data currently played back is 4000 kbps and also the condition set by the content playback request is at least 2000 kbps, the arbitration unit 404 issues an inquiry regarding whether or not the content database 504 stores content data that is at least 2000 kbps and less than 4000 kbps.

The arbitrating unit 404 judges whether corresponding content data exists and whether or not the bit rate can be reduced (S3008). If it is not possible (No at S3008) processing is returned to the step S3005, and processing is repeated regarding the other sessions. However, if it is possible (Yes at S3008) it is determined that the quality is changed, and the event detection processing is completed. Next, the arbitrating unit 404 transmits to the content playback apparatus 7 the content quality change request that changes to the corresponding content data.

Also, after it is determined that the quality is changed, processing from the step S3001 may be redone and the other sessions may be judged as well. In that case, because one session has been changed in quality and has varied the load condition, more accurate judgment with respect to the other sessions can be done. Also, even if the arbitrating unit 404 determines to change the quality, without completing the event detection processing, the processing steps S3005 to S3008 may be performed and, after judging whether or not bit rate in all sessions can be reduced, with respect to bit rates that can be reduced, the content quality change request may be transmitted. If this is done, more simplified processing is achieved, and, because the judgment is made with respect to all sessions under the same conditions at some point in time, the fairness to the user improves.

Figures 27, 28:
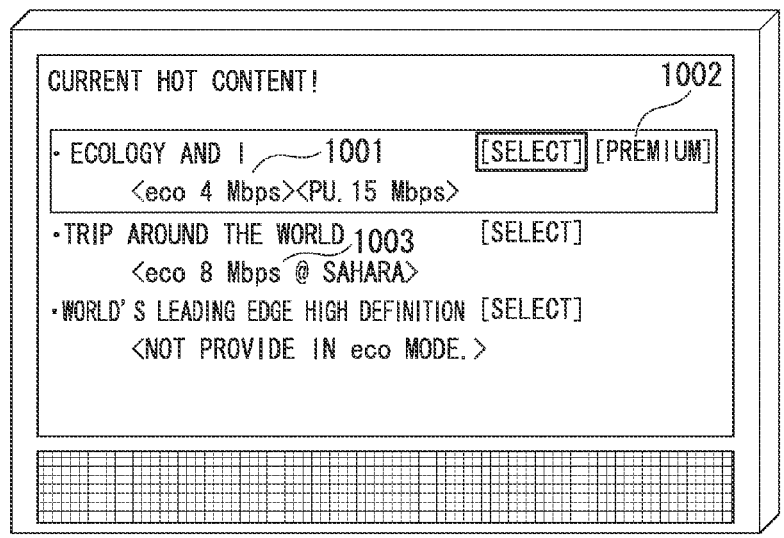
FIG. 27 shows an example of a content quality change request in the same variation example.
FIG. 28 is an outer view showing an example of a screen display of the content playback apparatus 7.

FIG. 27 shows an example of a content quality change request at the sequence S310. FIG. 27 is the example of requesting a change to content data of 2000 kbps. Compared with the content quality result notification in FIG. 25, the difference is having an INVITE message in first line, an SDP Offer at the seventh line, and a bit rate of 2000 kbps specified at the twelfth line.

Although the present variation has been described as a variation example of the first embodiment, it is possible to change the quality midway during playback of content in the same manner as for the second embodiment. Additionally, as in the second embodiment, when content distribution apparatuses operate at a plurality of locations, if the environment index can be increased, the session may be passed over between the content distribution apparatuses installed at different locations (for example, the content distribution apparatuses 4-A and 4-B of the second embodiment). In that case, the arbitrating units 1404 of the content distribution apparatuses, which serve as intermediaries, compare both of the quality change detection processing results and, if necessary, establish a session, so that the change in quality is achieved by changing the IP address of the "a=fmtp:33 uri" parameter of the message to be transmitted (FIG. 27).

As described above, even if it becomes impossible to handle power used for content distribution by clean energy midway during playback of content due to an increase in the number of sessions, a decrease in the amount of power generation of clean energy, and the like, the quality is change, such as by changing the bit rate or the apparatus for distributing, so as to be able to handle power used for content distribution by clean energy, so that environmental load is suppressed in distributing content.

Although in the each of the embodiments the environmental index is calculated by dividing power used into two stages of clean energy and unclean energy, the power may be divided into more stages to calculate the environmental index.

Also, although in the above described embodiment "eco", which requests content distribution that gives preference to the environment is set as parameter in the content playback request, the degree of prioritization may be set as parameter, for example, by using the above-described environmental index. In that case, the arbitrating unit in the content distributing apparatus determines the quality so as to satisfy the environmental index that has been set.

Although the detailed description thus far was with regard to exchanges of messages on a network, accompanying this some sort of display may be made on a screen of the content playback apparatus 7. In S201 in FIG. 6, for example, it is envisioned that some information regarding the eco mode is displayed in the content list for selecting content. FIG. 28 is an outer view showing an example of a screen display. Reference numeral 1001 indicates that it is possible to play back content "Ecology and I" with a quality of 4 Mbps in eco mode at that time. This represents a meaningful display for a user in that selection is not done for the quality of 2 Mbps, but selection is done for the quality of 4 Mbps. Also, in the case of not the eco mode but rather the usual mode being desired, selection may be done of [Premium], indicated by the reference numeral 1002, which does not use eco mode. In that case, as described above, for example, information regarding the eco mode is not added to the <a> tag, so that a control regarding eco mode described in the present embodiment is be performed.

Reference numeral 1003 indicates selection of the content distribution apparatus 4 that is installed in the "Sahara (Sahara Desert)", playing back with quality of 8 Mbps in eco mode. In that case, even if the delay might be great, the user can obtain reassurance by virtue of the selection of "the Sahara desert". Regarding "4 Mbps" of the reference numeral 1001 and "8 Mbps" of the reference numeral 1003, when the content distribution apparatus 4 transmits the content list screen in FIG. 6, by executing the sequences S203 to S205 that assume the eco mode to be specified beforehand, display is enabled.

A program for the purpose of implementing the functions of the power information unit 301 and the power supplying unit 302 shown in FIG. 4, a program for the purpose of implementing the functions of the power detecting unit 401, the power information management unit 402, the load detecting unit 403, the arbitrating unit 404, the session management unit 405, the content management unit 406, the history management unit 407, the billing processor 408, and the network communication unit 409, or a program for the purpose of implementing the functions of the user input unit 701, the eco mode setting unit 702, the content requesting unit 704, the content control unit 705, the communication unit 706, and the data receiving unit 707, or a program for the purpose of implementing the functions of the power detecting unit 401, the power information management unit 402, the load detecting unit 403, the arbitrating unit 1404, the session management unit 1405, the content management unit 406, the history management unit 407, the billing processor 408, and the network communication unit 409 shown in FIG. 19 may be recorded on a computer-readable recording medium, and a computer system may read and execute the program recorded on the recording medium, thereby performing processing of each unit. The term "computer system" includes an operating system and also hardware, such as peripheral devices.

The term "computer system" also includes a webpage-providing environment (or display environment) if the WWW system is used.

The term "computer-readable recording medium" refers to a portable medium, such as a flexible disk, an optical-magnetic disc, a ROM, and a CD-ROM, and a storage device, such as a hard disk, that is built into a computer system. Additionally, the term "computer-readable recording medium" includes something that dynamically retains a program for a short time, for example, a communication line when the program is transmitted via a network such as the Internet, and a communication line such as a telephone line, as well as a medium to retains a program for a certain time, for example, a volatile memory internally provided in a computer system acting as the server and client in that case. The above-noted program may implement a part of the above-described functions, and may also implement the above-described functions in combination with a program already stored in a computer system.

Although the embodiments of the present invention have been described above with references made to the accompanying drawings, the specific constitution thereof is not limited to the embodiments, and the present invention encompasses design changes and the like that do not depart from the spirit of the present invention.

INDUSTRIAL APPLICABILITY

The present invention is applicable to a content distributing system.

REFERENCE SYMBOLS

1: Grid power
2: Solar photovoltaic panel
3: Power controller
4: Content distribution apparatus
5: Database apparatus
6: Network
7: Content playback apparatus
10: Ethernet (registered trademark) switching apparatus
31: CPU
32: Main memory unit
33: Auxiliary memory unit
34: Power sensor
35: Power supply unit
36: Communication unit
37: Storage battery
41: CPU
42: Main memory unit
43: Auxiliary memory unit
44: Power sensor
45: Power supply unit
46: Communication unit
47: Display
48: Keyboard
51: CPU
52: Main memory unit
53: Auxiliary memory unit
54: Communication unit
71: CPU
72: Main memory unit
73: Auxiliary memory unit
74: Display unit
75: Speaker
76: Input unit
77: Communication unit
761: Remote controller

The invention claimed is:

1. A contents distribution system that is supplied with power from a plurality of power sources using a plurality of environmental loads, the plurality of environmental loads being different from each other, the contents distribution system distributing contents to a contents playback apparatus, the contents playback apparatus being connected via a communication circuit, wherein
the contents distribution system is configured to receive a contents distribution request from the contents playback apparatus,
the contents distribution system is configured to distribute contents with respect to the contents distribution request from the contents playback apparatus with a service quality that is determined so as to suppress the plurality of environmental loads by the power supplied from the plurality of power sources to a predetermined environmental load,
the plurality of environmental loads relate to an emission of carbon dioxide, and
the plurality of power sources comprise first and second power sources, the first power source using clean energy that does not emit carbon dioxide at a time of power generation, the second power source using unclean energy that emits carbon dioxide at a time of power generation.

2. The contents distribution system according to claim 1, further comprising a contents distribution apparatus configured to distribute the contents to the contents playback apparatus, wherein
the contents distribution apparatus comprises:
a power detecting unit configured to detect an amount of power used of each of the plurality of power sources;
a load detecting unit configured to detect an amount of load of the contents distribution apparatus;
an arbitrating unit configured to determine, with respect to the contents distribution request from the contents playback apparatus, based on the detected amount of power used and load amount, a bit rate of the distributed contents so that the plurality of environmental loads by the power supplied from the plurality of power sources are suppressed to the predetermined environmental load; and
a contents distributing unit configured to distribute contents data at the bit rate determined by the arbitrating unit.

3. The contents distribution system according to claim 2, wherein
the power detecting unit is configured to detect, of the plurality of power sources, at least one of a power that can be supplied by the plurality of power sources other than a power source with largest environmental load, and
the arbitrating unit, in determining the bit rate for the contents to be distributed, is configured to use the power that can be supplied.

4. The contents distribution system according to claim 3, wherein
the arbitrating unit is configured to determine the bit rate of the contents being distributed so as to suppress to the predetermined environmental load, in case that the arbitrating unit judges, based on the amount of power used
and the amount of power that can be supplied, which is
detected by the power detecting unit, and the amount of
load which is detected by the power detecting unit, that
it becomes impossible midway in contents distribution
to suppress to the predetermined environment load, and the contents distributing unit is configured to change the bit
rate of the contents being distributed to the determined
bit rate.

5. The contents distribution system according to claim 1, wherein the contents distribution system comprises a billing processor configured to determine a billed amount based on an environmental index that is a degree to which the power consumed with the distribution of contents suppresses the use of the unclean energy.

6. The contents distribution system according to claim 1, further comprising a plurality of contents distribution apparatuses configured to distribute contents to the contents playback apparatus, wherein at least one of the contents distribution apparatuses is supplied power by a power source that is different from that of the others, and with respect to the contents distribution request from the contents playback apparatus, the contents distribution apparatus that distributes contents is selected so that the plurality of environmental loads by the power supplied from the plurality of power sources are suppressed to the predetermined environmental load.

7. The contents distribution system according to claim 1, wherein the distribution of contents with respect to the contents distribution request from the contents playback apparatus with the service quality that is determined so as to suppress to the predetermined environmental load is done in case that an instruction is given from the contents playback apparatus for distribution with the suppressed environmental loads.

8. The contents distribution system according to claim 2, wherein the distribution of contents with respect to a contents distribution request from the contents playback apparatus with a service quality that is determined so as to suppress to the predetermined environmental load is done in case that an instruction is given from the contents playback apparatus for distribution with a suppressed environmental load.

9. The contents distribution system according to claim 3, wherein the distribution of contents with respect to a contents distribution request from the contents playback apparatus with a service quality that is determined so as to suppress to the predetermined environmental load is done in case that an instruction is given from the contents playback apparatus for distribution with a suppressed environmental load.

10. The contents distribution system according to claim 4, wherein the distribution of contents with respect to a contents distribution request from the contents playback apparatus with a service quality that is determined so as to suppress to the predetermined environmental load is done in case that an instruction is given from the contents playback apparatus for distribution with a suppressed environmental load.

11. The contents distribution system according to claim 2, wherein the arbitrating unit is configured to determine, in case that the load amount of the contents distribution apparatus reaches a predetermined maximum load amount, the bit rate of the distributed contents so that the plurality of environmental loads by the power supplied from the plurality of power sources is suppressed to the predetermined environmental load.

12. The contents distribution system according to claim 2, wherein the arbitrating unit stores a first contents data and a second contents data, the first contents data relating to the contents, the second contents data relating to the contents, a bit rate of the second contents data being smaller than that of the first contents data, the arbitrating unit is configured to select one of the first contents data and the second contents data, the selection being made so as to suppress the plurality of environmental loads by the power supplied from the plurality of power sources to the predetermined environmental load, and the contents distributing unit is configured to distribute the one of the first contents data and the second contents data selected by the arbitrating unit.

13. A contents distribution apparatus that is supplied with power from a plurality of power sources using a plurality of environmental loads, the plurality of environmental loads being different from each other, the contents distribution apparatus distributing contents to a contents playback apparatus, the contents playback apparatus being connected via a communication circuit, the contents distribution apparatus comprising:

a communication unit configured to receive a contents distribution request from the contents playback apparatus; and a control unit configured to distribute contents with respect to the contents distribution request received by the communication unit with a service quality that is determined so as to suppress the plurality of environmental loads by the power supplied from the plurality of power sources to a predetermined environmental load, wherein the plurality of environmental loads relate to an emission of carbon dioxide, and the plurality of power sources comprise first and second power sources, the first power source using clean energy that does not emit carbon dioxide at a time of power generation, the second power source using unclean energy that emits carbon dioxide at a time of power generation.

14. A contents distribution method for distributing contents to a contents playback apparatus, the contents playback apparatus being connected via a communication circuit, the contents playback apparatus being supplied with power from a plurality of power sources using a plurality of environmental loads, the plurality of environmental loads being different from each other, the contents distribution method comprising:

distributing contents with respect to a contents distribution request from the contents playback apparatus with a service quality that is determined so as to suppress the plurality of environmental loads by the power supplied from the plurality of power sources to a predetermined environmental load, wherein
the plurality of environmental loads relate to an emission of carbon dioxide,
and
the plurality of power sources comprise first and second power sources, the first power source using clean energy that does not emit carbon dioxide at a time of power generation, the second power source using unclean energy that emits carbon dioxide at a time of power generation.

15. A non-transitory computer readable recording medium storing a program for causing a computer of a contents distribution apparatus that is supplied with power from a plurality of power sources using a plurality of environmental loads, the plurality of environmental loads being different from each other, the contents distribution apparatus distributing content contents to a contents playback apparatus, the contents playback apparatus being connected via a communication circuit, the program making the computer function as:

first means for receiving a contents distribution request from the contents playback apparatus; and second means for distributing contents with respect to the contents distribution request received by the first means with a service quality that is determined so as to suppress the plurality of environmental loads by the power supplied from the plurality of power sources to a predetermined environmental load, wherein
the plurality of environmental loads relate to an emission of carbon dioxide,
and
the plurality of power sources comprise first and second power sources, the first power source using clean energy that does not emit carbon dioxide at a time of power generation, the second power source using unclean energy that emits carbon dioxide at a time of power generation.

16. A contents playback apparatus comprising:

a communication unit configured to receive contents distributed by a contents distribution apparatus that distributes contents with a service quality determined so that a plurality of environmental loads by power supplied from a plurality of power sources is suppressed to a predetermined environmental load, the plurality of environmental loads being different from each other;

a playback unit configured to play back the contents received by the communication unit; and a control unit configured to instruct the contents distribution apparatus to distribute with a suppressed environmental load, wherein
the plurality of environmental loads relate to an emission of carbon dioxide,
and
the plurality of power sources comprise first and second power sources, the first power source using clean energy that does not emit carbon dioxide at a time of power generation, the second power source using unclean energy that emits carbon dioxide at a time of power generation.

* * * * *